United States Patent
Yasman et al.

(10) Patent No.: US 10,511,509 B2
(45) Date of Patent: Dec. 17, 2019

(54) TECHNOLOGIES FOR JITTER-ADAPTIVE LOW-LATENCY, LOW POWER DATA STREAMING BETWEEN DEVICE COMPONENTS

(71) Applicant: INTEL CORPORATION, Santa Clara, CA (US)

(72) Inventors: Eugene Yasman, Haifa (IL); Nir Gerber, Haifa (IL); Sumit Mohan, San Jose, CA (US); Jean-Pierre Giacalone, Sophia-Antipolis (FR)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 15/481,708

(22) Filed: Apr. 7, 2017

(65) Prior Publication Data

US 2018/0295039 A1 Oct. 11, 2018

(51) Int. Cl.
*H04L 12/26* (2006.01)
*H04L 12/861* (2013.01)
*H04L 12/883* (2013.01)
*H04L 12/70* (2013.01)

(52) U.S. Cl.
CPC ............ *H04L 43/087* (2013.01); *H04L 43/16* (2013.01); *H04L 49/9005* (2013.01); *H04L 49/9021* (2013.01); *H04L 49/9052* (2013.01); *H04L 49/9078* (2013.01); *H04L 2012/5681* (2013.01)

(58) Field of Classification Search
CPC ... H04L 43/087; H04L 43/16; H04L 49/9005; H04L 49/9021; H04L 49/9052; H04L 49/9078; H04L 49/9084; H04L 94/9094; H04L 2012/5681; G06F 3/0659; G06F 5/12–16; G06F 7/785; G06F 13/1642
See application file for complete search history.

(56) References Cited

U.S. PATENT DOCUMENTS

2003/0182464 A1* 9/2003 Hamilton ................ G06F 9/546
  719/314
2004/0034640 A1* 2/2004 Jain .......................... G06F 16/21

* cited by examiner

*Primary Examiner* — Eric Myers
(74) *Attorney, Agent, or Firm* — Barnes & Thornburg LLP

(57) ABSTRACT

Technologies for low-latency data streaming include a computing device having a processor that includes a producer and a consumer. The producer generates a data item, and in a local buffer producer mode adds the data item to a local buffer, and in a remote buffer producer mode adds the data item to a remote buffer. When the local buffer is full, the producer switches to the remote buffer producer mode, and when the remote buffer is below a predetermined low threshold, the producer switches to the local buffer producer mode. The consumer reads the data item from the local buffer while operating in a local buffer consumer mode and reads the data item from the remote buffer while operating in a remote buffer consumer mode. When the local buffer is above a predetermined high threshold, the consumer may switch to a catch-up operating mode. Other embodiments are described and claimed.

15 Claims, 7 Drawing Sheets

TECHNOLOGIES FOR JITTER-ADAPTIVE LOW-LATENCY, LOW POWER DATA STREAMING BETWEEN DEVICE COMPONENTS

BACKGROUND

Typical computing devices include multiple internal components that exchange data. For example, a typical processor may include multiple functional blocks such as image signal processors (ISPs), display engines, and/or media encoders that exchange data. Transient imbalances between the rate that a producer generates data and the rate that a corresponding consumer consumes the data are known as jitter. To manage jitter, current computing devices may drop generated data or buffer multiple groupings of data (e.g., image or video frames) in a remote memory buffer.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
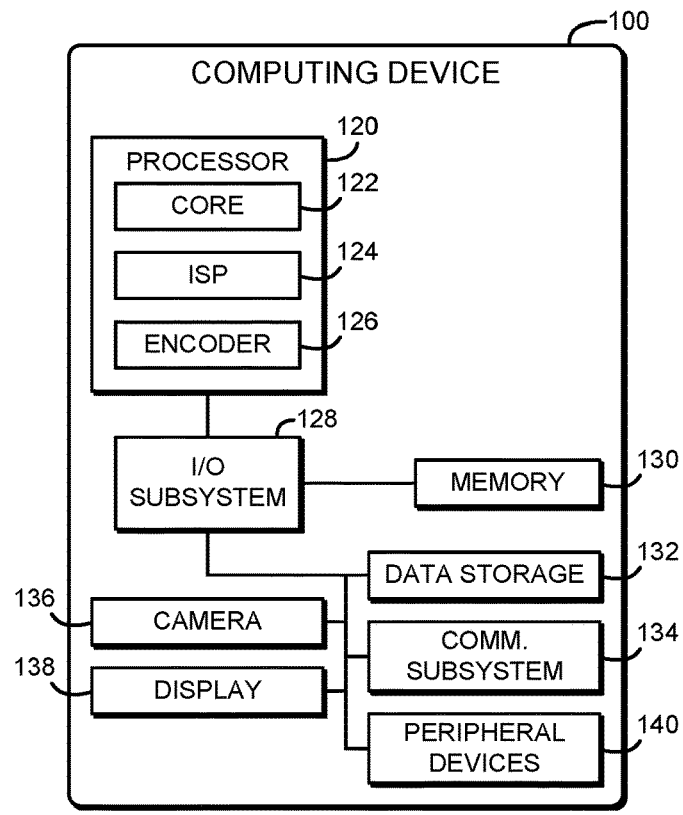
FIG. 1 is a simplified block diagram of at least one embodiment of a computing device for low-latency data streaming.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for low-latency data streaming is shown. In use, as described below, the computing device 100 includes a producer component and a consumer component, which may be embodied as functional blocks, semiconductor intellectual property (IP) cores, or other components of a processor. Both the producer and the consumer initially communicate data using a local buffer, which may be accessed using low power consumption. If the local buffer fills, then the producer switches to a remote buffer, which requires higher power consumption but may include a larger data capacity. The consumer continues to process data in the order it was produced (e.g., in raster order), and when all data in the local buffer is processed, the consumer switches to the remote buffer. When the amount of data in the remote buffer is reduced below a predetermined threshold, the producer switches back to adding data to the local buffer. In some embodiments, when the local buffer exceeds a predetermined high threshold, the consumer and/or the producer may switch to a catch-up mode to reduce the gap between the rate of production and the rate of consumption. When the producer and the consumer are both operating on the local buffer and the local buffer is below the high threshold, the producer and/or the consumer may exit the catch-up mode. Thus, the computing device 100 may dynamically adapt to varying amounts of jitter by switching between local and remote buffers, without dropping data or requiring the producer and consumer to switch between different modes of operation (i.e., without switching from raster data streaming to frame-based transfer).

By using the local buffer when possible (e.g., when jitter is low and manageable by the local buffer), the computing device 100 may reduce power consumption and/or latency as compared to systems that exclusively use large remote buffers, while still maintaining the capability to manage varying amounts of jitter. Additionally, the computing device 100 may dynamically adjust the rate of production and/or consumption, which may further improve power consumption. Further, the computing device 100 may manage jitter without introducing backpressure or producer stalling, and thus may be usable with producers that are incapable of stalling or otherwise reducing the rate of production (e.g., real-time producers such as image sensors, image signal processors, and/or display engines). Also, the computing device 100 may be scaled to different memory types and/or buffer sizes based on jitter, latency, power, and/or footprint considerations.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes a processor core 122, an image signal processor (ISP) 124, and a media encoder 126. The processor core 122 is an independent, general-purpose processing unit capable of executing programmed instructions. For example, the processor core 122 may execute instructions from a general-purpose instruction set architecture (ISA) such as IA-32 or Intel® 64. The illustrative processor 120 is a single-core processor 120 having one processor core 122; however, it should be understood that in other embodiments the processor 120 may be embodied as a multi-core or multi-threaded processor, digital signal processor, microcontroller, or other processor or processing/controlling circuit with multiple processor cores or other independent processing units.

The image signal processor (ISP) 124 may be embodied as any logic, co-processor, integrated circuit, or other circuitry capable of processing two-dimensional or three-dimensional image data or video data captured by one or more image sensors of the computing device 100. Similarly, the media encoder 126 may be embodied as any logic, co-processor, integrated circuit, or other circuitry capable of media processing such as accelerated video encoding and/or accelerated video decoding. Each of the ISP 124 and the media encoder 126 may be embodied as a separate functional block, IP core, or other component of the processor 120 and thus may be included on the same integrated circuit chip and/or in the same package as the processor core 122 and other subcomponents of the processor 120. In some embodiments, the ISP 124 and/or the media encoder 126 may be included in a processor graphics, graphics processing unit, or other graphics processor.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 128 may form a portion of a system-on-a-chip (SoC) and be incorporated, along with the processor 120, the memory 130, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The computing device 100 further includes a camera 136 and a display 138. The camera 136 may be embodied as a digital camera or other digital imaging device integrated with the computing device 100 or otherwise communicatively coupled thereto. The camera 136 includes an electronic image sensor, such as an active-pixel sensor (APS), e.g., a complementary metal-oxide-semiconductor (CMOS) sensor, or a charge-coupled device (CCD). The camera 136 may be communicatively coupled with the ISP 124, which may process data received from the camera 136. The display 138 may be embodied as any type of display capable of displaying digital information, such as a liquid crystal display (LCD), a light emitting diode (LED), a plasma display, a cathode ray tube (CRT), or other type of display device. The display 138 may include or otherwise be coupled to a display engine, which may be embodied as any logic, co-processor, integrated circuit, functional block, IP core, or other circuitry capable of generating image data for display by the display 138.

As shown, the computing device 100 may further include one or more peripheral devices 140. The peripheral devices 140 may include any number of additional input/output devices, interface devices, and/or other peripheral devices. For example, in some embodiments, the peripheral devices 140 may include a display, touch screen, graphics circuitry, keyboard, mouse, speaker system, microphone, network interface, and/or other input/output devices, interface devices, and/or peripheral devices.

Figure 2:
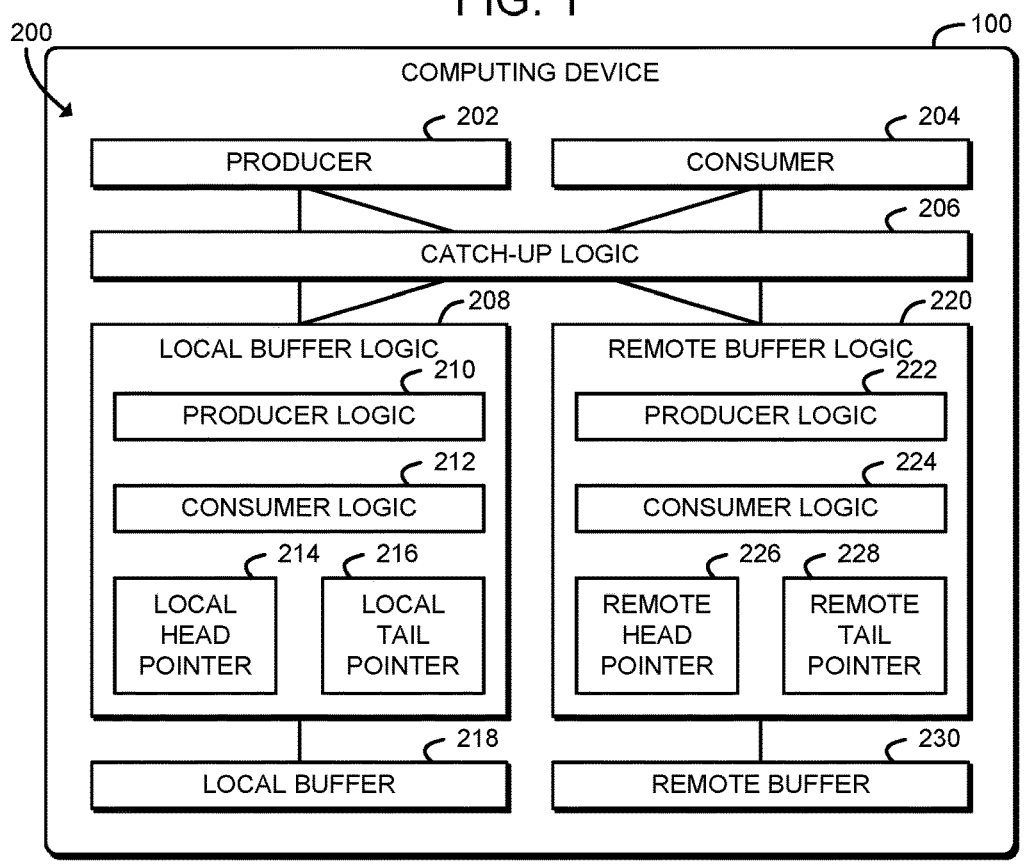
FIG. 2 is a simplified block diagram of at least one embodiment of an environment of the computing device of FIGS. 1 and 2.

Referring now to FIG. 2, in an illustrative embodiment, the computing device 100 establishes an environment 200 during operation. The illustrative environment 200 includes a producer 202, a consumer 204, a catch-up logic 206, a local buffer logic 208, and a remote buffer logic 220. The various components of the environment 200 may be embodied as hardware, firmware, software, or a combination thereof. As such, in some embodiments, one or more of the components of the environment 200 may be embodied as circuitry or collection of electrical devices (e.g., producer circuitry 202, consumer circuitry 204, catch-up logic circuitry 206, local buffer logic circuitry 208, and/or remote buffer logic circuitry 220). It should be appreciated that, in such embodiments, one or more of the producer circuitry 202, the consumer circuitry 204, the catch-up logic circuitry 206, the local buffer logic circuitry 208, and/or the remote buffer logic circuitry 220 may form a portion of the processor 120, the I/O subsystem 128, and/or other components of the computing device 100. Additionally, in some embodiments, one or more of the illustrative components may form a portion of another component and/or one or more of the illustrative components may be independent of one another.

The producer 202 is configured to generate one or more data items. The producer 202 may operate in a local buffer producer mode or a remote buffer producer mode. In the local buffer producer mode, the producer 202 is configured to add the data items to a local buffer 218, and in the remote buffer producer mode, the producer 202 is configured to add the data items to a remote buffer 230. The producer 202 may be embodied as a functional block, IP core, or other component of the processor 120. For example, the producer 202 may be embodied as the image signal processor 124 or a display engine of the computing device 100.

The consumer 204 is configured to determine whether any data items are available in the local buffer 218 or the remote buffer 230. The consumer 204 may operate in a local buffer consumer mode or a remote buffer consumer mode. In the local buffer consumer mode, the consumer 204 is configured to read data items from the local buffer 218, and in the remote buffer consumer mode, the consumer 204 is configured to read data items from the remote buffer 230. Similar to the producer 202, the consumer 204 may be embodied as a functional block, IP core, or other component of the processor 120. For example, the consumer 204 may be embodied as the media encoder 126. Illustratively, the media encoder 126 may read data from the ISP 124 and then encode video data. As another illustration, the media encoder 126 may read data from a display engine and then encode video data, for example to perform display casting (e.g., for Intel® Wireless Display or Miricast™).

The catch-up logic 206 is configured to determine whether the local buffer 218 is above a high threshold in response to generating a data item. The producer 202 and/or the consumer 204 may be configured to switch to a catch-up operating mode in response to determining that the local buffer 218 is above the high threshold. The catch-up logic 206 is further configured to determine, if the local buffer 218 is not above the high threshold, whether the remote buffer 230 is also empty. The producer 202 and/or the consumer 204 may be further configured to switch to a normal operating mode in response to determining that the remote buffer 230 is empty.

The local buffer logic 208 is configured to determine whether the local buffer 218 is full in response to generating the data item while operating in the local buffer producer mode and, if full, to switch to the remote buffer producer mode. The local buffer logic 208 is further configured to determine whether the local buffer 218 is empty in response to determining that a data item is available while operating in the local buffer consumer mode and, if empty, to switch to the remote buffer consumer mode. In some embodiments, those functions may be performed by one or more sub-components, such as a producer logic 210 and/or a consumer logic 212.

The local buffer 218 may be embodied as any ring buffer or other cyclic memory buffer that is accessible by both the producer 202 and the consumer 204 with lower required power consumption as compared to accessing the remote buffer 230. For example, the local buffer 218 may be embodied as a local memory or a cache of the processor 120. The producer 202 may add data to the local buffer 218 at a position indicated by a local head pointer 214 and increment the local head pointer 214. The consumer 204 may read data from the local buffer 218 at a position indicated by a local tail pointer 216 and increment the local tail pointer 216. Both the local head pointer 214 and the local tail pointer 216 may be accessible to the producer 202 and the consumer 204.

The remote buffer logic 220 is configured to determine whether the remote buffer 230 is below a low threshold in response to generating a data item while operating in the remote buffer producer mode and, if below the low threshold, to switch to the local buffer producer mode. The remote buffer logic 220 is further configured to determine whether the remote buffer 230 is empty in response to determining that a data item is available while operating in the remote buffer consumer mode and, if empty, to switch to the local buffer consumer mode. In some embodiments, those functions may be performed by one or more sub-components, such as a producer logic 222 and/or a consumer logic 224.

The remote buffer 230 may be embodied as any ring buffer or other cyclic memory buffer that is accessible by both the producer 202 and the consumer 204. Accessing the remote buffer 230 may require higher power consumption as compared to accessing the local buffer 218. However, the remote buffer 230 may have a larger capacity to handle a larger amount of jitter (e.g., enough capacity to store one or more video frames or partial video frames). For example, the remote buffer 230 may be embodied as or otherwise included in the system memory 130 of the computing device 100. The producer 202 may add data to the remote buffer 230 at a position indicated by a remote head pointer 226 and increment the remote head pointer 226. The consumer 204 may read data from the remote buffer 230 at a position indicated by a remote tail pointer 228 and increment the remote tail pointer 228. Both the remote head pointer 226 and the remote tail pointer 228 may be accessible to the producer 202 and the consumer 204. Additionally or alternatively, although illustrated as a cyclic buffer, it should be understood that in some embodiments the remote buffer 230 may be embodied as a non-cyclic buffer, such as a buffer used to transfer frames between a producer and a consumer in queue/de-queue buffer rotation manner.

Although illustrated as including a single producer 202 and consumer 204, it should be understood that the computing device 100 may include many producers 202 and/or consumers 204. In some embodiments, the computing device 100 may include localized flow control for a dedicated producer-consumer pair (e.g., a dedicated local buffer logic 208 and remote buffer logic 220). Additionally or alternatively, in some embodiments the computing device 100 may include shared centralized memory access logic to serve many different producer-consumer connections (e.g., a centralized local buffer logic 208 and remote buffer logic 220). Additionally or alternatively, in some embodiments certain functions of the producer 202 and/or consumer 204 may be performed by dedicated and/or centralized producer logic and/or consumer logic that is transparent to the underlying producer 202 and/or consumer 204, respectively. For example, the data streaming and/or catch-up logic as described above may be performed by remapping memory accesses performed by the producer 202 and/or consumer 204 and/or by redirecting corresponding memory traffic.

Figure 3:
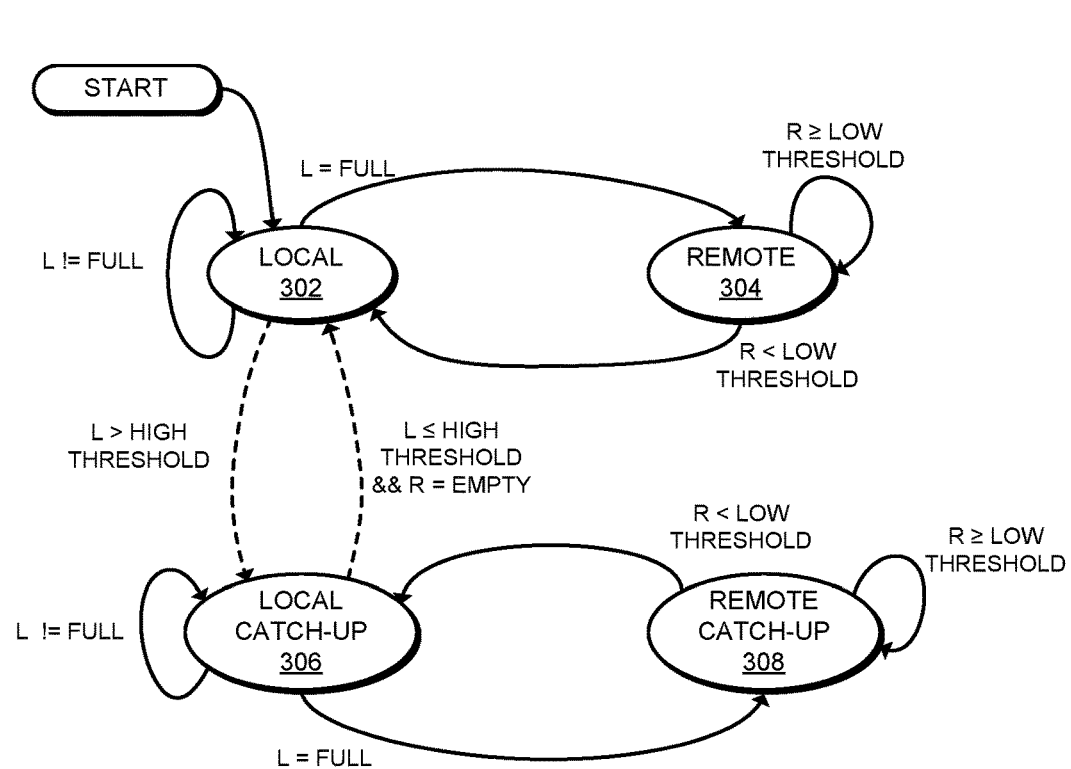
FIG. 3 is a state transition diagram of at least one embodiment of various states of a producer component of the computing device of FIGS. 1 and 2.

Referring now to FIG. 3, state transition diagram 300 illustrates various states that may be established by the producer 202. As shown, the producer 202 starts in a local state 302. In the local state 302, the producer 202 adds data to the local buffer 218, for example at the location of the local head pointer 214. While the local buffer 218 is not full, the producer 202 remains in the local state 302. If the local buffer 218 is full, the producer 202 transitions to a remote state 304. In the remote state 304, the producer 202 adds data to the remote buffer 230, for example at the location of the remote head pointer 226. While the remote buffer 230 is above a predetermined low threshold, the producer 202 remains in the remote state 304. If the remote buffer 230 falls below the low threshold, the producer 202 transitions back to the local state 302.

As shown, in some embodiments, if the producer 202 is in the local state 302 and the local buffer 218 exceeds a predetermined high threshold, the producer 202 may transition to a local catch-up state 306. In the local catch-up state 306, the producer 202 continues to add data to the local buffer 218 but may stall or otherwise reduce the rate of production. While the local buffer 218 is not full, the producer 202 remains in the local catch-up state 306. If the local buffer 218 is full, the producer 202 transitions to a remote catch-up state 308. In the remote catch-up state 308, the producer 202 adds data to the remote buffer 230, and may continue at the reduced rate of production. While the remote buffer 230 is above the predetermined low threshold, the producer 202 remains in the remote catch-up state 308. If the remote buffer 230 falls below the low threshold, the producer 202 transitions back to the local catch-up state 306. While in the local catch-up state 306, if the local buffer 218 falls below the high threshold and the remote buffer 230 is empty, the producer 202 may transition back to the local state 302.

Figure 4:
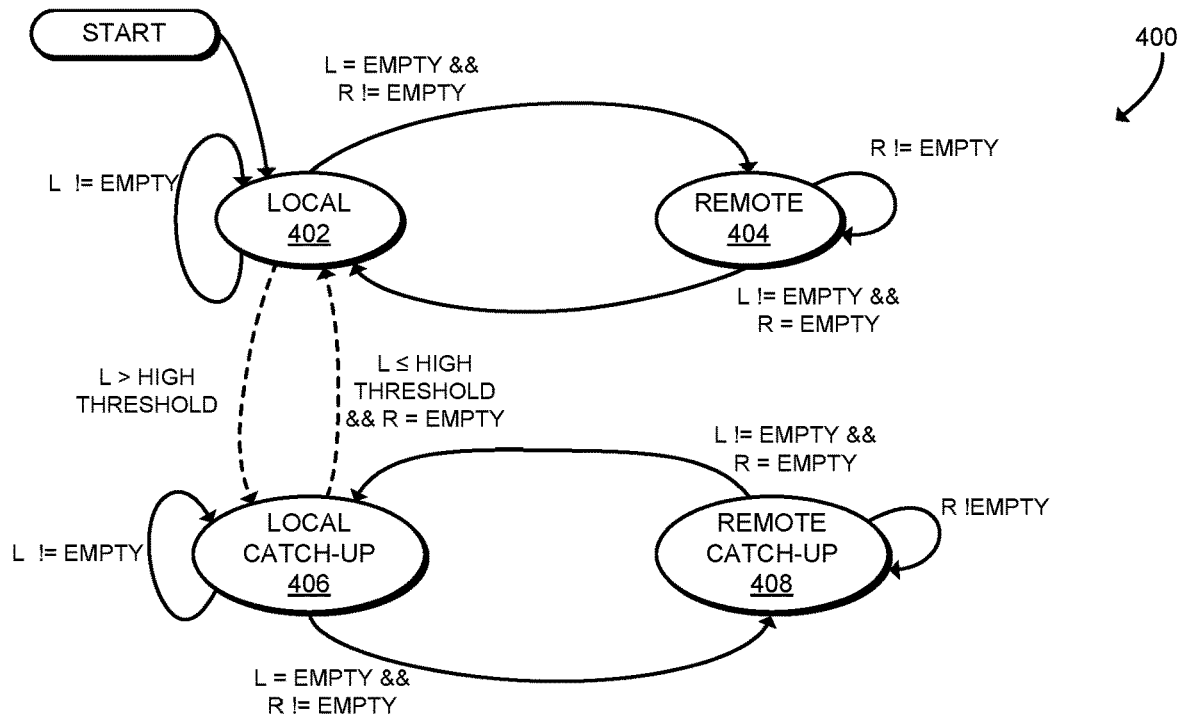
FIG. 4 is a state transition diagram of at least one embodiment of various states of a consumer component of the computing device of FIGS. 1 and 2.

Referring now to FIG. 4, state transition diagram 400 illustrates various states that may be established by the consumer 204. As shown, the consumer 204 starts in a local state 402. In the local state 402, the consumer 204 removes data from the local buffer 218, for example at the location of the local tail pointer 216. While the local buffer 218 is not empty, the consumer 204 remains in the local state 402. If the local buffer 218 is empty and the remote buffer 230 is not empty, the consumer 204 transitions to a remote state 404. In the remote state 404, the consumer 204 removes data from the remote buffer 230, for example at the location of the remote tail pointer 228. While the remote buffer 230 is not empty, the consumer 204 remains in the remote state 404. If the remote buffer 230 is empty and the local buffer 218 is not empty, the consumer 204 transitions back to the local state 402.

As shown, in some embodiments, if the consumer 204 is in the local state 402 and the local buffer 218 exceeds the predetermined high threshold, the consumer 204 may transition to a local catch-up state 406. In the local catch-up state 406, the consumer 204 continues to remove data from the local buffer 218, but may increase the rate of consumption. While the local buffer 218 is not empty, the consumer 204 remains in the local catch-up state 406. If the local buffer 218 is empty and the remote buffer 230 is not empty, the consumer 204 transitions to a remote catch-up state 408. In the remote catch-up state 408, the consumer 204 removes data from the remote buffer 230, and may continue at the increased rate of consumption. While the remote buffer 230 is not empty, the consumer 204 remains in the remote catch-up state 408. If the remote buffer 230 is empty and the local buffer 218 is not empty, the consumer 204 transitions back to the local catch-up state 406. While in the local catch-up state 406, if the local buffer 218 falls below the high threshold and the remote buffer 230 is empty, the consumer 204 may transition back to the local state 402.

It should be understood that in some embodiments the producer 202 and/or the consumer 204 may establish different transitions between states than those shown in FIGS. 3 and 4. For example, a transition may exist from the local state 302, 402 to the remote catch-up state 308, 408, from the remote state 304, 404 to remote catch-up state 308, 408, and/or from the local catch-up state 306, 406 to the remote state 304, 404, respectively. The various transitions may be managed by different thresholds for local and remote operation.

Figure 5:
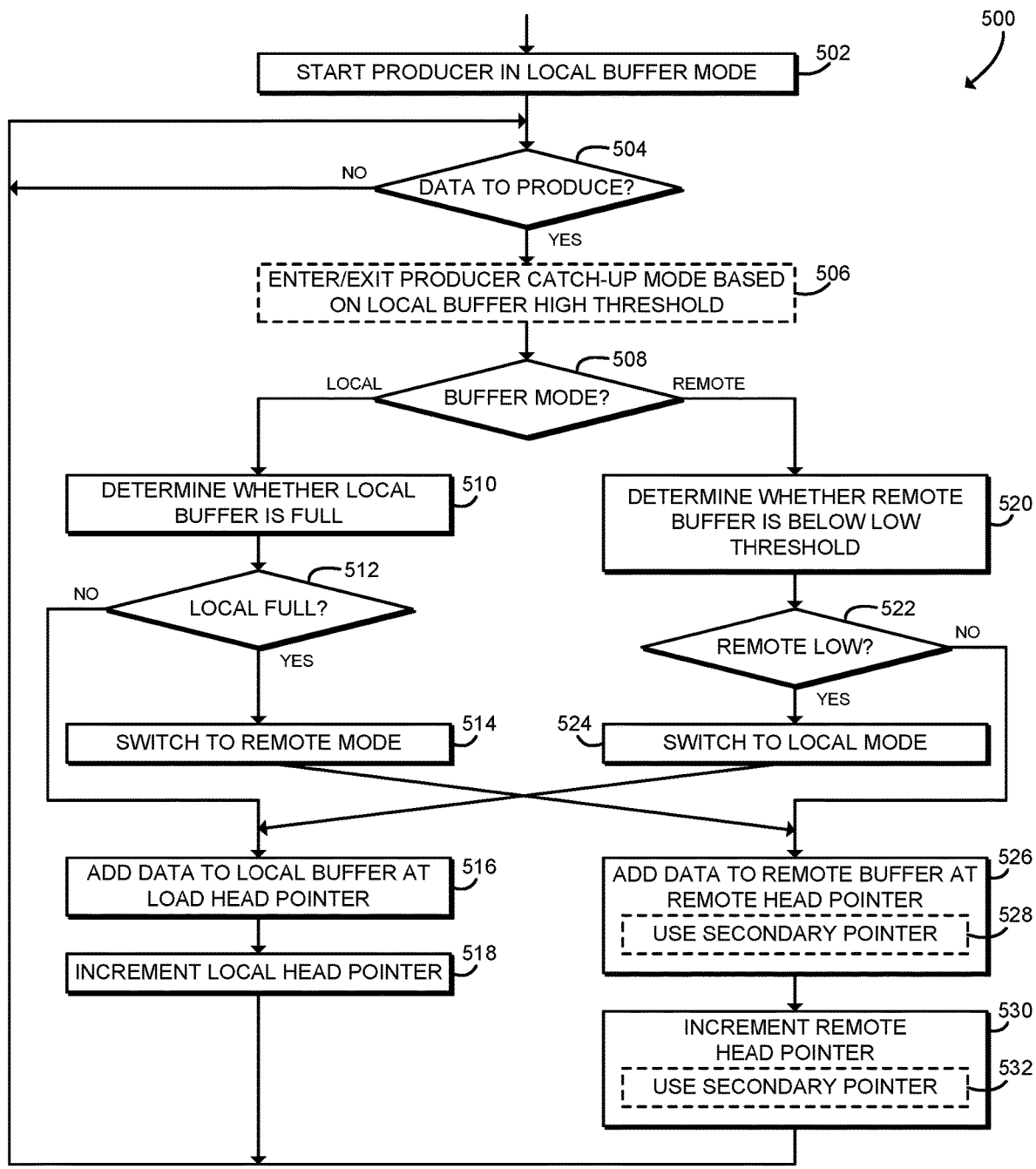
FIG. 5 is a simplified flow diagram of at least one embodiment of a method for low-latency data stream production that may be executed by the computing device of FIGS. 1 and 2.

Referring now to FIG. 5, in use, the computing device 100 may execute a method 500 for low-latency data streaming production. It should be appreciated that, in some embodiments, the operations of the method 500 may be performed by one or more components of the environment 200 of the computing device 100 as shown in FIG. 2. The method 500 begins in block 502, in which the computing device 100 starts the producer 202 in local buffer mode. In block 504, the computing device 100 determines whether data exists to produce. For example, the ISP 124 may determine whether image sensor data exists, a display engine may determine whether video display data exists, or any other producer 202 may determine whether data exists. If no data exists to produce, the method 500 loops back to block 504 to continue monitoring for data to produce. If data exists, the method 500 advances to block 506.

In block 506, in some embodiments the computing device 100 may enter or exit a producer catch-up mode based on whether the local buffer 218 exceeds a high threshold. In the producer catch-up mode, the producer 202 may stall or otherwise reduce the rate of production in order to allow the consumer 204 to consume data from the local buffer 218 and/or the remote buffer 230 (thereby bringing the local buffer 218 back below the high threshold). Of course, in some embodiments the producer 202 may not be capable of stalling and thus the computing device 100 may not enter the producer catch-up mode. One potential embodiment of a method for determining whether to enter or exit the catch-up mode is described further below in connection with FIG. 7.

In block 508, the computing device 100 determines whether the producer 202 is operating in local buffer mode or remote buffer mode. If operating in the remote buffer mode, the method 500 branches to block 520, described further below. If operating in the local buffer mode, the method 500 branches to block 510.

In block 510, the computing device 100 determines whether the local buffer 218 is full. The local buffer 218 may be embodied as a cyclic buffer, ring buffer, or other memory buffer with a limited capacity. The local buffer 218 may be full when the local buffer 218 does not include any free space or other remaining capacity and/or when adding additional data to the local buffer 218 would exceed the remaining free space or other remaining capacity. In some embodiments, to determine whether the local buffer 218 is full, the computing device 100 may compare the local head pointer 214 and the local tail pointer 216 (e.g., to determine whether incrementing the local head pointer 214 would reach the local tail pointer 216, to determine whether the pointers 214, 216 are equal, or to otherwise compare the pointers 214, 216 based on the implementation of the local buffer 218). In block 512, the computing device 100 checks whether the local buffer 218 is full. If the local buffer 218 is not full, the method 500 branches ahead to block 516, described below. If the local buffer 218 is full, the method 500 advances to block 514.

In block 514, the computing device 100 switches to the remote buffer mode for the producer 202. As described further below, in the remote buffer mode, the producer 202 adds generated data to the remote buffer 230. Thus, after switching to the remote buffer mode, the method 500 branches to block 526, described below.

Referring back to block 512, if the local buffer 218 is not full, the method 500 branches to block 516. In block 516, the producer 202 of the computing device 100 adds generated data (e.g., one or more bytes, words, or other data items) to the local buffer 218 at a position determined by the local head pointer 214. In block 518, the computing device 100 increments the local head pointer 214, to prepare for adding additional data to the local buffer 218. Because the local buffer 218 is cyclic, incrementing the local head pointer 214 may cause the value of the local head pointer 214 to wrap around to the beginning of the local buffer 218. Additionally, although illustrated in blocks 516, 518 as adding data to the local buffer 218 and then incrementing the local head pointer 214, it should be understood that those operations may ° be performed in any appropriate order, based on the particular implementation of the local buffer 218. After adding the data to the local buffer 218, the method 500 loops back to block 504 to monitor for the generation of additional data.

Referring back to block 508, if the computing device 100 is operating in the remote buffer mode, the method 500 branches to block 520. In block 520, the computing device 100 determines whether the remote buffer 230 is below a low threshold. The remote buffer 230 may be embodied as a cyclic buffer, ring buffer, or other memory buffer with a particular capacity. The remote buffer 230 may be below the low threshold when the amount of data included in the remote buffer 230 (e.g., the number of bytes, words, or other data items) is below a predetermined threshold amount of data. In some embodiments, to determine whether the remote buffer 230 is below the low threshold, the computing device 100 may compare the remote head pointer 226 and the remote tail pointer 228. For example, the computing device 100 may determine whether the remote tail pointer 228 is within a certain predetermined distance to the remote head pointer 226. In block 522, the computing device 100 checks whether the remote buffer 230 is below the low threshold. If the remote buffer 230 is not below the low threshold (i.e., the amount of data in the remote buffer 230 is greater than or equal to the low threshold), the method 500 branches ahead to block 526, described below. If the remote buffer 230 is below the low threshold, the method 500 advances to block 524.

In block 524, the computing device 100 switches to the local buffer mode for the producer 202. As described above, in the local buffer mode, the producer 202 adds generated data to the local buffer 218. Thus, after switching to the local buffer mode, the method 500 branches to block 516, described above.

Referring back to block 522, if the remote buffer 230 is not below the low threshold, the method 500 branches to block 526. In block 526, the producer 202 of the computing device 100 adds generated data (e.g., one or more bytes, words, or other data items) to the remote buffer 230 at a position determined by the remote head pointer 226. In some embodiments, in block 528 the producer 202 may store the data using a secondary remote head pointer 226. For example, if the remote buffer 230 is not empty when switching to the remote buffer mode (e.g., if data from a previous transition to the remote buffer mode has not been processed by the consumer 204 and is still in the remote buffer 230), the producer 202 may use a secondary remote head pointer 226. One potential embodiment of a secondary remote head pointer 226 is described further below in connection with FIG. 10.

In block 530, the computing device 100 increments the remote head pointer 226, to prepare for additional data in the remote buffer 230. Because the remote buffer 230 is cyclic, incrementing the remote head pointer 226 may cause the value of the remote head pointer 226 to wrap around to the beginning of the remote buffer 230. In some embodiments, in block 532 the computing device 100 may increment a secondary remote head pointer 226. Additionally, although illustrated in blocks 526, 530 as adding data to the remote buffer 230 and then incrementing the remote head pointer 226, it should be understood that those operations may be performed in any appropriate order, based on the particular implementation of the remote buffer 230. After adding the data to the remote buffer 230, the method 500 loops back to block 504 to monitor for the generation of additional data.

Figure 6:
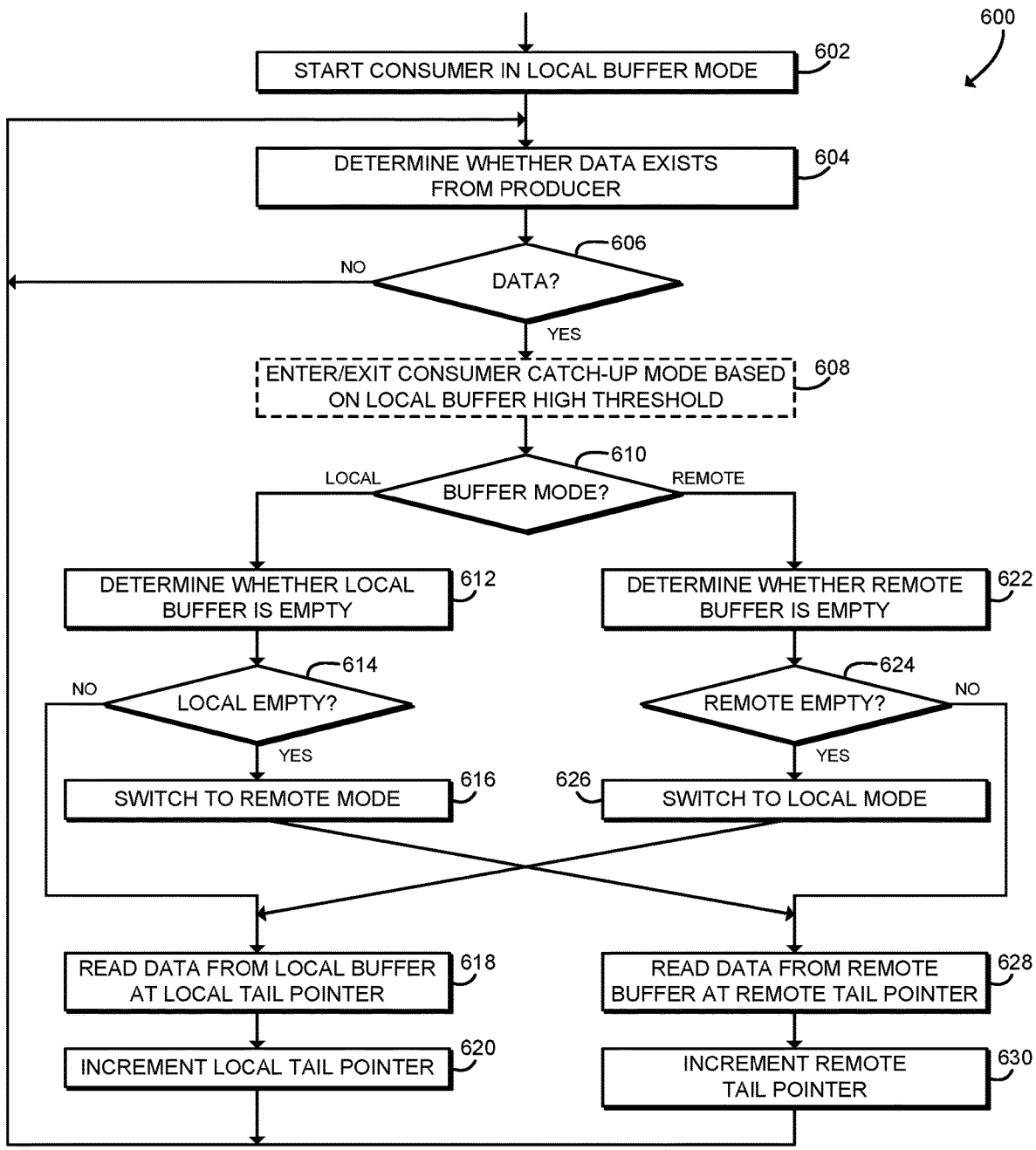
FIG. 6 is a simplified flow diagram of at least one embodiment of a method for low-latency data stream consumption that may be executed by the computing device of FIGS. 1 and 2.

Referring now to FIG. 6, in use, the computing device 100 may execute a method 600 for low-latency data streaming consumption. It should be appreciated that, in some embodiments, the operations of the method 600 may be performed by one or more components of the environment 200 of the computing device 100 as shown in FIG. 2. The method 600 begins in block 602, in which the computing device 100 starts the consumer 204 in local buffer mode. In block 604, the computing device 100 determines whether data exists from the producer 202 to be processed by the consumer 204. For example, the computing device 100 may determine whether data exists in either the local buffer 218 or the remote buffer 230. In block 606, the computing device 100 checks whether data exists. If not, the method 600 loops back to block 604 to continue monitoring for data from the producer 202. If data exists, the method 600 advances to block 608.

In block 608, in some embodiments the computing device 100 may enter or exit a consumer catch-up mode based on whether the local buffer 218 exceeds a high threshold. In the consumer catch-up mode, the consumer 204 may increase the rate of consumption in order to consume data from the local buffer 218 and/or the remote buffer 230 (thereby bringing the local buffer 218 back below the high threshold). Of course, in some embodiments the consumer 204 may not be capable of increasing consumption rate and thus the computing device 100 may not enter the consumer catch-up mode. One potential embodiment of a method for determining whether to enter or exit the catch-up mode is described further below in connection with FIG. 7.

In block 610, the computing device 100 determines whether the consumer 204 is operating in local buffer mode or remote buffer mode. If operating in the remote buffer mode, the method 600 branches to block 622, described further below. If operating in the local buffer mode, the method 600 branches to block 612.

In block 612, the computing device 100 determines whether the local buffer 218 is empty. The local buffer 218 may be embodied as a cyclic buffer, ring buffer, or other memory buffer with a limited capacity. The local buffer 218 may be empty when the local buffer 218 does not include any data (e.g., the consumer 204 has processed all data generated by the producer 202 in the local buffer 218). In some embodiments, to determine whether the local buffer 218 is empty, the computing device 100 may compare the local head pointer 214 and the local tail pointer 216 (e.g., to determine whether the pointers 214, 216 are equal, or to otherwise compare the pointers 214, 216 based on the implementation of the local buffer 218). In block 614, the computing device 100 checks whether the local buffer 218 is empty. If the local buffer 218 is not empty, the method 600 branches ahead to block 618, described below. If the local buffer 218 is empty, the method 600 advances to block 616.

In block 616, the computing device 100 switches to the remote buffer mode for the consumer 204. As described further below, in the remote buffer mode, the consumer 204 reads data from the remote buffer 230. Thus, after switching to the remote buffer mode, the method 600 branches to block 628, described below.

Referring back to block 614, if the local buffer 218 is not empty, the method 600 branches to block 618. In block 618, the consumer 204 of the computing device 100 reads data (e.g., one or more bytes, words, or other data items) from the local buffer 218 at a position determined by the local tail pointer 216. In block 620, the computing device 100 increments the local tail pointer 216, to prepare to read additional data from the local buffer 218. Because the local buffer 218 is cyclic, incrementing the local tail pointer 216 may cause the value of the local tail pointer 216 to wrap around to the beginning of the local buffer 218. Additionally, although illustrated in blocks 618, 620 as reading data from the local buffer 218 and then incrementing the local tail pointer 216, it should be understood that those operations may be performed in any appropriate order, based on the particular implementation of the local buffer 218. After reading the data from the local buffer 218, the method 500 loops back to block 604 to monitor for additional data from the producer 202.

Referring back to block 610, if the computing device 100 is operating in the remote buffer mode, the method 600 branches to block 622. In block 622, the computing device 100 determines whether the remote buffer 230 is empty. The remote buffer 230 may be embodied as a cyclic buffer, ring buffer, or other memory buffer with a particular capacity. The remote buffer 230 may be empty when the remote buffer 230 does not include any data (e.g., the consumer 204 has processed all data generated by the producer 202 in the remote buffer 230). In some embodiments, to determine whether the remote buffer 230 is empty, the computing device 100 may compare the remote head pointer 226 and the remote tail pointer 228 (e.g., to determine whether the pointers 226, 228 are equal, or to otherwise compare the pointers 226, 228 based on the implementation of the remote buffer 230). In block 624, the computing device 100 checks whether the remote buffer 230 is empty. If the remote buffer 230 is not empty, the method 600 branches ahead to block 628, described below. If the remote buffer 230 is empty, the method 600 advances to block 626.

In block 626, the computing device 100 switches to the local buffer mode for the consumer 204. As described above, in the local buffer mode, the consumer 204 reads data from the local buffer 218. Thus, after switching to the local buffer mode, the method 600 branches to block 618, described above.

Referring back to block 624, if the remote buffer 230 is not empty, the method 600 branches to block 628. In block 628, the consumer 204 of the computing device 100 reads generated data (e.g., one or more bytes, words, or other data items) from the remote buffer 230 at a position determined by the remote tail pointer 228. In block 630, the computing device 100 increments the remote tail pointer 228, to prepare to read additional data from the remote buffer 230. Because the remote buffer 230 is cyclic, incrementing the remote tail pointer 228 may cause the value of the remote tail pointer 228 to wrap around to the beginning of the remote buffer 230. Additionally, although illustrated in blocks 628, 630 as reading data from the remote buffer 230 and then incrementing the remote tail pointer 228, it should be understood that those operations may be performed in any appropriate order, based on the particular implementation of the remote buffer 230. After reading the data from the remote buffer 230, the method 600 loops back to block 604 to monitor for additional data from the producer 202.

Figure 7:
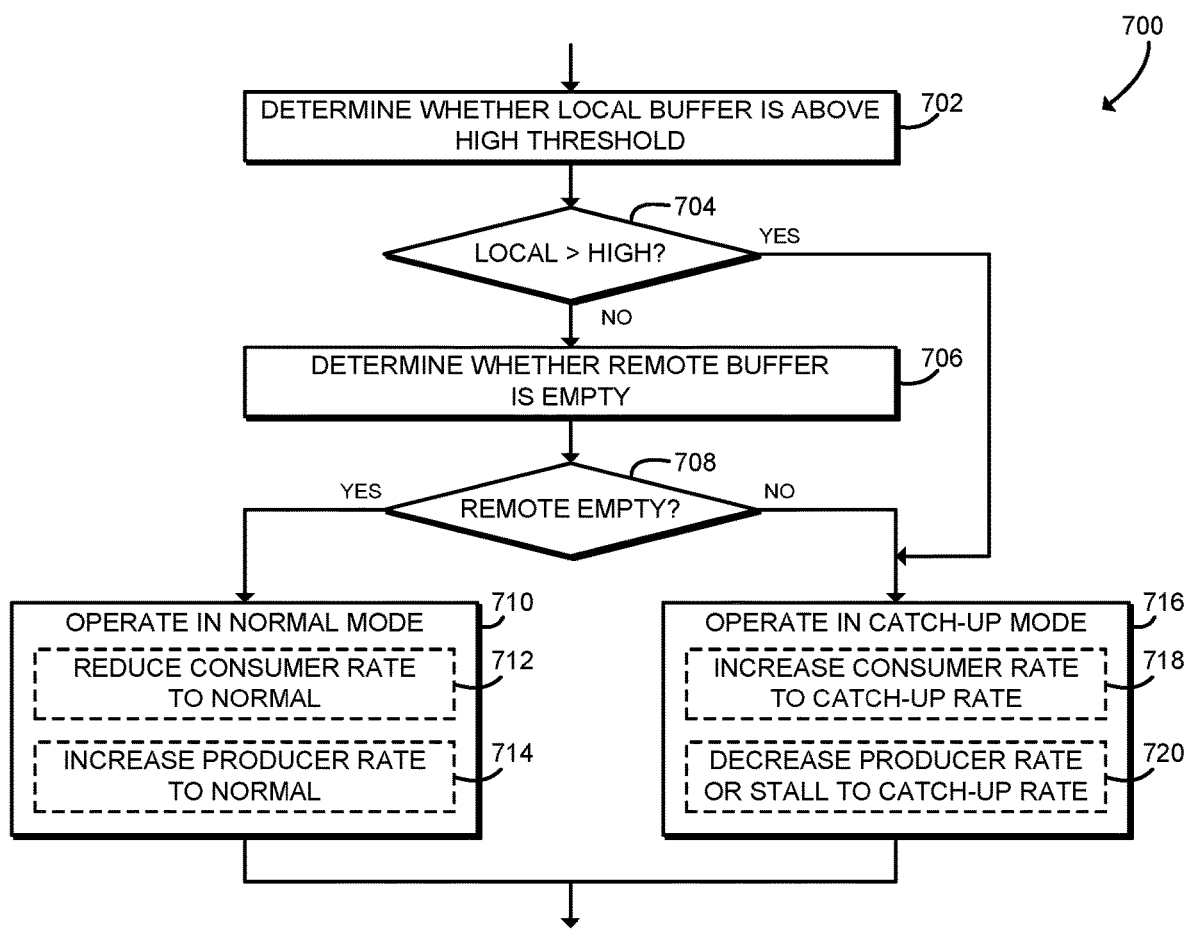
FIG. 7 is a simplified flow diagram of at least one embodiment of a method for catch-up logic that may be executed by the computing device of FIGS. 1 and 2.

Referring now to FIG. 7, in use, the computing device 100 may execute a method 700 for catch-up mode logic. The method 700 may be executed when producing or consuming streaming data, as described above in connection with block 506 of FIG. 5 and/or block 608 of FIG. 6. It should be appreciated that, in some embodiments, the operations of the method 700 may be performed by one or more components of the environment 200 of the computing device 100 as shown in FIG. 2.

The method 700 begins in block 702, in which the computing device 100 determines whether the local buffer 218 is above a high threshold. The computing device 100 may use any appropriate technique to determine whether the local buffer 218 includes more than a predetermined amount of data. For example, the computing device 100 may compare the local head pointer 214 to the local tail pointer 216 to determine whether the local head pointer 214 is within a predetermined distance from reaching the local tail pointer 216 (i.e., within the predetermined distance of being full). If the local buffer 218 stores more data than the high threshold, then the computing device 100 may be experiencing excessive jitter; that is, the consumer 204 has fallen behind the producer 202. For example, the media encoder 126 may fall behind the ISP 124 or a display engine during processing of an unrelated media encoding job (e.g., while encoding an image at the request of an application). In block 704, the computing device 100 checks whether the local buffer 218 is above the high threshold. If not, the method 700 advances to block 706, described below. If the local buffer 218 is above the high threshold, the method 700 branches to block 716.

In block 716, the computing device 100 operates in the catch-up mode. Operating in the catch-up mode may cause the consumer 204 to consume data at a faster rate than the producer 202 produces data. Thus, operating in the catch-up mode may allow the consumer 204 to process and remove data from the local buffer 218 and/or the remote buffer 230 until the local buffer 218 is back below the high threshold. The computing device 100 may use any technique to cause or attempt to cause the consumer 204 to operate at a faster rate than the producer 202. In some embodiments, in block 718 the computing device 100 may increase the consumer rate to a faster, catch-up rate. For example, the computing device 100 may increase a dynamic voltage and frequency scaling (DVFS) factor of the consumer 204 in order to cause the consumer 204 to process data more quickly and/or to otherwise improve throughput of the consumer 204. Similarly, in some embodiments in block 720 the computing device 100 may reduce the producer rate to a slower, catch-up rate or otherwise stall the producer 202. For example, the computing device 100 may decrease a dynamic voltage and frequency scaling (DVFS) factor of the producer 202 in order to cause the producer 202 to generate data more slowly and/or to otherwise reduce the amount of data generated by the producer 202. The particular catch-up strategy used may depend on the capabilities of the producer 202 and/or consumer 204. For example, real-time producers such as the ISP 124 or a display engine may not be capable of changing their production rate, and in those embodiments the computing device 100 may increase the rate of consumption of the consumer 204. After entering or otherwise operating in the catch-up mode, the method 700 is completed. The producer 202 and/or the consumer 204 may continue to operate in the catch-up mode until the method 700 is executed again to exit the catch-up mode.

Referring back to block 704, if the local buffer 218 is below the high threshold, then the method 700 advances to block 706. In block 706, the computing device 100 determines whether the remote buffer 230 is empty. For example, the computing device 100 may compare the remote head pointer 226 and the remote tail pointer 228 to determine whether any data remains in the remote buffer 230. In block 708, the computing device 100 checks whether the remote buffer 230 is empty. If the remote buffer 230 is not empty (and the local buffer 218 is below the high threshold as determined in connection with block 704), then the consumer 204 is still processing data items in the remote buffer 230 after completing the items in the local buffer 218. Thus, the method 700 branches to block 716 to continue operating in the catch-up mode, as described above. If the remote buffer 230 is empty (and the local buffer 218 is below the high threshold as determined in connection with block 704), then both the producer 202 and the consumer 204 are operating on the local buffer 218, and the method 700 branches to block 710. Additionally or alternatively, in some embodiments the computing device 100 may determine whether the remote buffer 230 is below a low threshold rather than completely empty.

In block 710, the computing device 100 operates in the normal mode or otherwise exits the catch-up mode. In the normal mode, the producer 202 may generate data faster than the consumer 204 processes the data, but the producer 202 and/or the consumer 204 may be capable of operating with lower power consumption. In some embodiments, in block 712 the computing device 100 may reduce the consumer rate to a normal rate. For example, the computing device 100 may decrease a DVFS factor of the consumer 204 in order to cause the consumer 204 to process data more slowly and/or to otherwise reduce throughput of the consumer 204. Similarly, in some embodiments in block 714 the computing device 100 may increase the producer rate to a higher, normal rate. For example, the computing device 100 may increase a DVFS factor of the producer 202 in order to cause the producer 202 to generate data more quickly and/or to otherwise increase the amount of data generated by the producer 202. After entering or otherwise operating in the normal mode, the method 700 is completed. The producer 202 and/or the consumer 204 may continue to operate in the normal mode until the method 700 is executed again to exit the normal mode.

Figure 8:
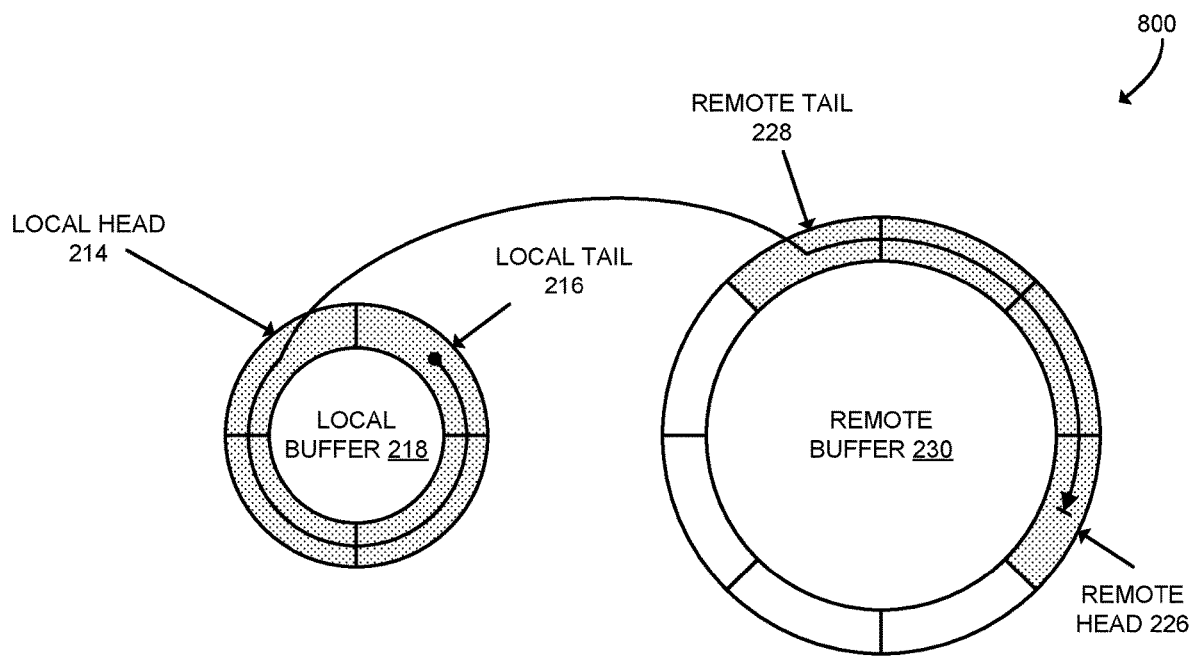
FIGS. 8-11 are schematic diagrams illustrating various embodiments of a local buffer and a remote buffer that may be established by the computing device of FIGS. 1 and 2.

Referring now to FIG. 8, schematic diagram 800 illustrates the local buffer 218 and the remote buffer 230. The diagram 800 illustrates the buffers 218, 230 after data has been spilled from the local buffer 218 to the remote buffer 230. As shown, data extends from the local tail pointer 216 to the local head pointer 214 in the local buffer 218 and then from the remote tail pointer 228 to the remote head pointer 226 in the remote buffer 230. The data may include image data or other data in the order it was received, and thus may include one or more image frames or partial frames. As shown, the local head pointer 214 cannot be incremented without colliding with the local tail pointer 216, and thus the local buffer 218 is full. Additionally, in some embodiments, the local buffer 218 may exceed the high threshold, and thus the consumer 204 may enter the catch-up mode. In the illustrative scenario, the producer 202 adds new data items to the remote buffer 230 at the remote head pointer 226, and the consumer 204 reads data items from the local buffer 218 at the local tail pointer 216.

Figure 9:
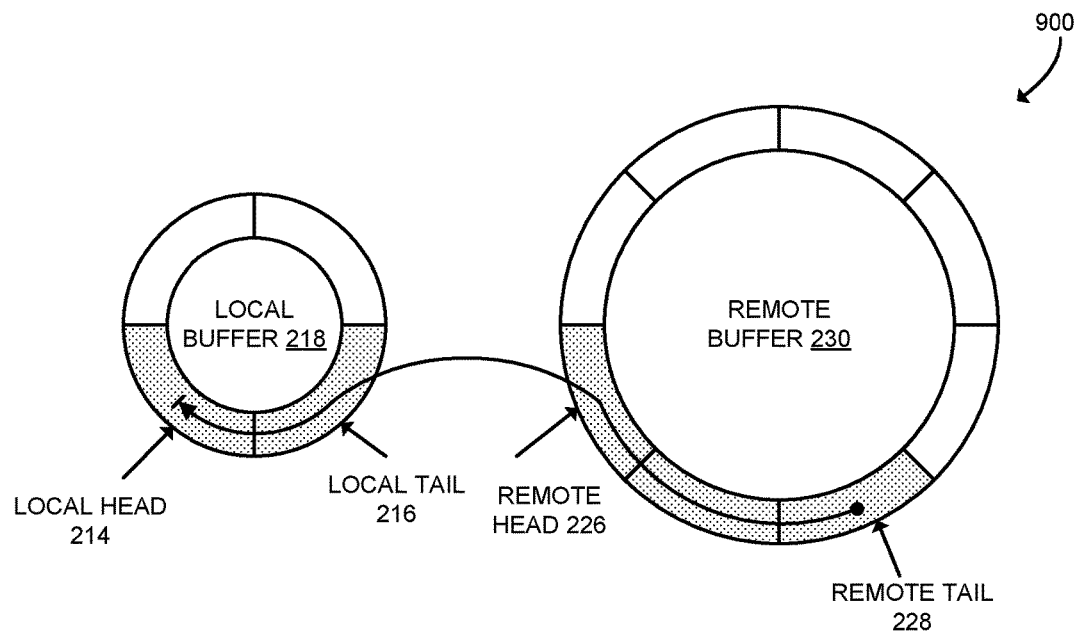

Referring now to FIG. 9, schematic diagram 900 illustrates the local buffer 218 and the remote buffer 230. The diagram 900 illustrates the buffers 218, 230 after the producer 202 has switched back to local buffer mode but the consumer 204 remains in remote buffer mode. As shown, data extends from the remote tail pointer 228 to the remote head pointer 226 in the remote buffer 230, and then from the local tail pointer 216 to the local head pointer 214 in the local buffer 218. The distance from the remote tail pointer 228 to the remote head pointer 226 is below the low threshold, and therefore the producer 202 has switched back to the local buffer 218. In the illustrative scenario, the producer 202 adds new data items to the local buffer 218 at the local head pointer 214, and the consumer 204 reads data items from the remote buffer 230 at the remote tail pointer 228. As the consumer 204 continues to read from the remote buffer 230, the consumer 204 may continue to operate in the catch-up mode. When the remote buffer 230 is empty and the consumer 204 switches back to the local buffer mode, the consumer 204 may exit the catch-up mode.

Figure 10:
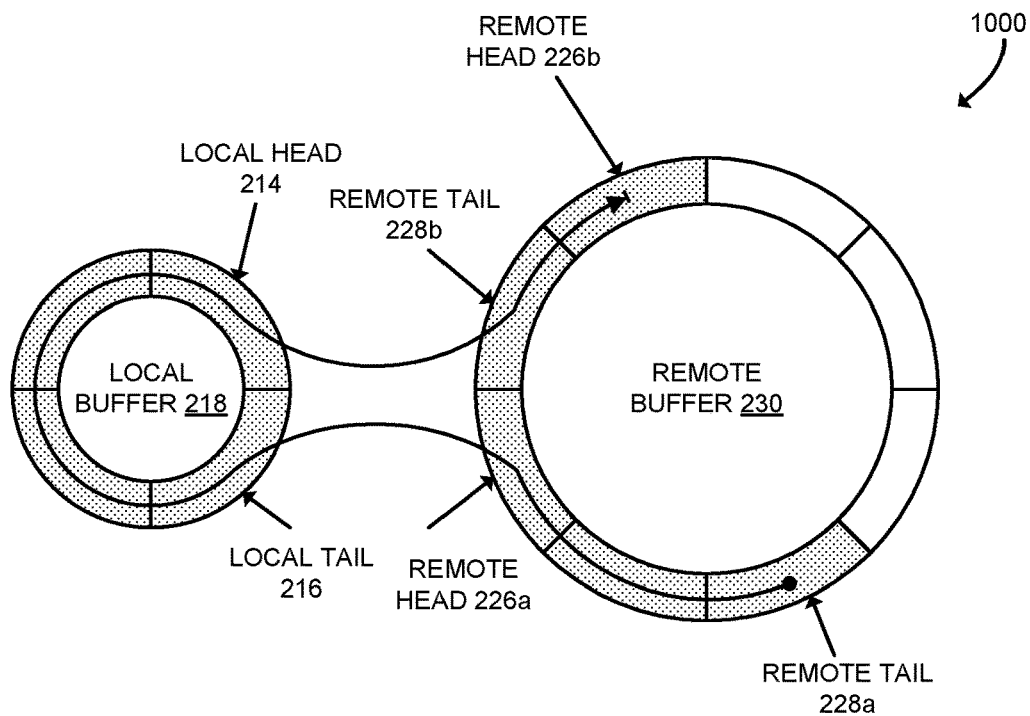

Referring now to FIG. 10, schematic diagram 1000 illustrates the local buffer 218 and the remote buffer 230. The diagram 1000 illustrates the buffers 218, 230 after the producer 202 has switched back to the remote buffer 230 while the consumer 204 is still operating on the remote buffer 230. In the illustrative scenario, the computing device 100 may use a secondary remote head pointer 226 and a secondary remote tail pointer 228 to track the data. As shown, the data extends from the remote tail pointer 228a to the remote head pointer 226a in the remote buffer 230, from the local tail pointer 216 to the local head pointer 214 in the local buffer 218, and then from the remote tail pointer 228b to the remote head pointer 226b in the remote buffer 230. In the illustrative scenario, the producer 202 adds new items to the remote buffer 230 at the remote head pointer 226b and the consumer 204 reads data items from the remote buffer 230 at the remote tail pointer 228a. When the consumer 204 causes the remote tail pointer 228a to reach the remote head pointer 226a, the consumer 204 switches to read from the local buffer 218 at the local tail pointer 216, similar to the scenario shown in FIG. 8.

Figure 11:
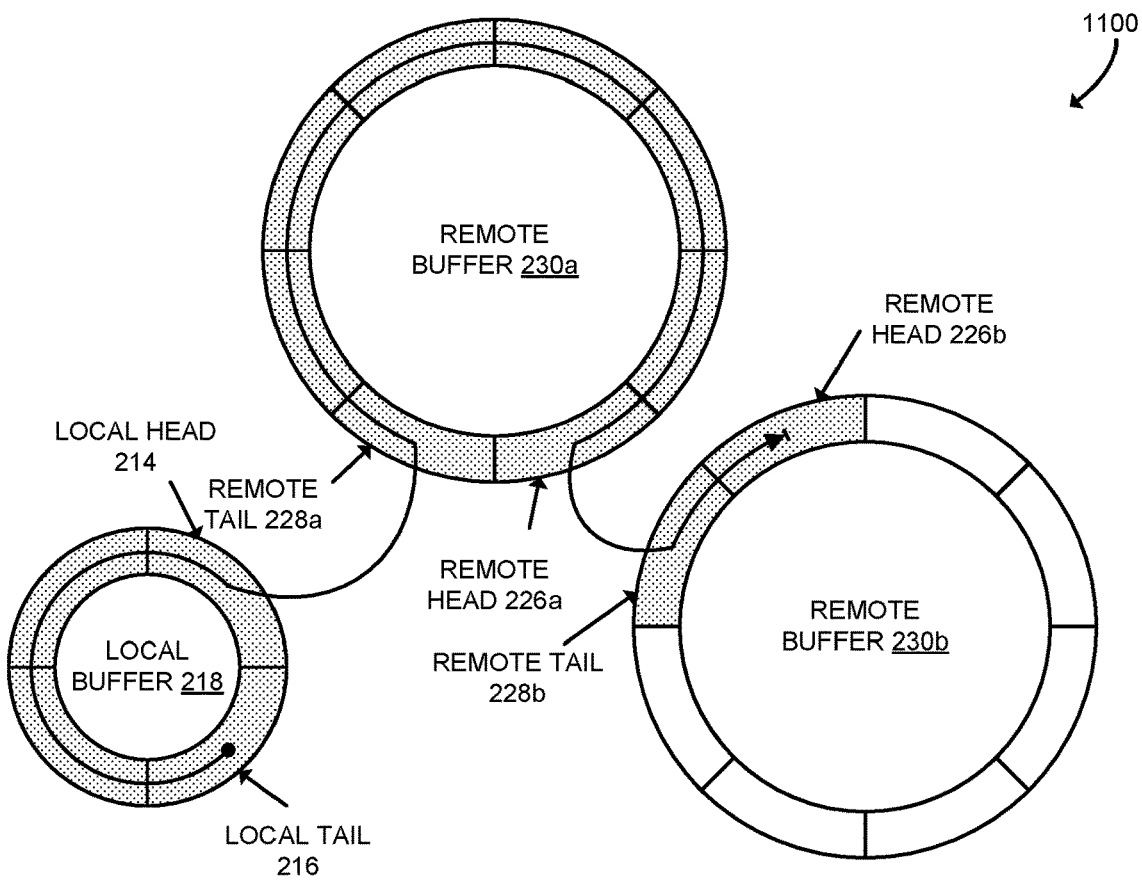

Referring now to FIG. 11, schematic diagram 1100 illustrates the local buffer 218 and multiple remote buffers 230a, 230b. As shown, in some embodiments the computing device 100 may chain multiple remote buffers 230 using an additional remote head pointer 226 and remote tail pointer 228. The diagram 1100 illustrates the buffers 218, 230a, 230b after the producer 202 has filled both the local buffer 218 and the remote buffer 230a, and has switched to the remote buffer 230b. As shown, the data extends from the local tail pointer 216 to the local head pointer 214 in the local buffer 218, from the remote tail pointer 228a to the remote head pointer 226a in the remote buffer 230a, and then from the remote tail pointer 228b to the remote head pointer 226b in the remote buffer 230b. In the illustrative scenario, the producer 202 adds new items to the remote buffer 230b at the remote head pointer 226b and the consumer 204 reads data items from the local buffer 218 at the local tail pointer 216. Similarly, in some embodiments the computing device 100 may use multiple local buffers 218 with multiple corresponding local head pointers 214 and local tail pointers 216 (not shown). For example, the computing device 100 may use a local memory and a cache memory to store multiple local buffers 218.

It should be appreciated that, in some embodiments, the methods 500, 600, and/or 700 may be embodied as various instructions stored on a computer-readable media, which may be executed by the processor 120, the I/O subsystem 128, and/or other components of the computing device 100 to cause the computing device 100 to perform the respective method 500, 600, and/or 700 respectively. The computer-readable media may be embodied as any type of media capable of being read by the computing device 100 including, but not limited to, the memory 130, the data storage device 132, firmware devices, other memory or data storage devices of the computing device 100, portable media readable by a peripheral device 140 of the computing device 100, and/or other media.

Examples

Illustrative examples of the technologies disclosed herein are provided below. An embodiment of the technologies may include any one or more, and any combination of, the examples described below.

Example 1 includes a computing device for data streaming between components, the computing device comprising: a producer component to generate a data item during operation in a local buffer mode or during operation in a remote buffer mode; a local buffer producer logic to (i) determine whether a local buffer is full in response to generation of the data item during operation in the local buffer mode, and (ii) switch to the remote buffer mode in response to a determination that the local buffer is full; and a remote buffer producer logic to (i) determine whether a remote buffer is below a low threshold in response to generation of the data item during operation in the remote buffer mode, and (ii) switch to the local buffer mode in response to a determination that the remote buffer is below the low threshold; wherein the producer component is further to (i) add the data item to the local buffer during operation in the local buffer mode, wherein the local buffer is accessible by the producer component and a consumer component of the computing device, and (ii) add the data item to the remote buffer during operation in the remote buffer mode, wherein the remote buffer is accessible by the producer component and the consumer component.

Example 2 includes the subject matter of Example 1, and wherein the local buffer is accessible with lower power consumption than the remote buffer is accessible.

Example 3 includes the subject matter of any of Examples 1 and 2, and wherein: the computing device comprises a processor that includes the producer component and the consumer component; and the local buffer comprises a local memory or a cache of the processor.

Example 4 includes the subject matter of any of Examples 1-3, and wherein the remote buffer comprises a system memory of the computing device.

Example 5 includes the subject matter of any of Examples 1-4, and further comprising: a catch-up logic to determine whether the local buffer is above a high threshold in response to generation of the data item; wherein the producer component is further to switch to a catch-up operating mode in response to a determination that the local buffer is above the high threshold.

Example 6 includes the subject matter of any of Examples 1-5, and wherein: the catch-up logic is further to determine whether the remote buffer is empty in response to a determination that the local buffer is not above the high threshold; and the producer component is further to switch to a normal operating mode in response to a determination that the remote buffer is empty.

Example 7 includes the subject matter of any of Examples 1-6, and wherein: to switch to the catch-up operating mode comprises to reduce a production rate of the producer component; and to switch to the normal operating mode comprises to increase the production rate of the producer component.

Example 8 includes the subject matter of any of Examples 1-7, and wherein: to reduce the production rate of the producer component comprises to reduce a voltage or frequency scaling factor of the producer component; and to increase the production rate of the producer component comprises to increase the voltage or frequency scaling factor of the producer component.

Example 9 includes the subject matter of any of Examples 1-8, and wherein to determine whether the local buffer is full comprises to determine whether addition of the data item to the local buffer would exceed a capacity of the local buffer.

Example 10 includes the subject matter of any of Examples 1-9, and wherein to determine whether the local buffer is full comprises to compare a local head pointer to a local tail pointer.

Example 11 includes the subject matter of any of Examples 1-10, and wherein to determine whether remote buffer is below the low threshold comprises to determine whether the remote buffer includes less than a predetermined number of data items.

Example 12 includes the subject matter of any of Examples 1-11, and wherein to determine whether the remote buffer is below the low threshold comprises to (i) compare a remote head pointer to a remote tail pointer, and (ii) determine whether a distance between the remote head pointer and the remote tail pointer is less than the predetermined number of data items.

Example 13 includes the subject matter of any of Examples 1-12, and wherein: to add the data item to the local buffer comprises to (i) add the data item to the local buffer at a position indicated by a local head pointer, wherein the local head pointer is accessible to the producer component and the consumer component, and (ii) increment the local head pointer; and to add the data item to the remote buffer comprises to (i) add the data item to the remote buffer at a position indicated by a remote head pointer, wherein the remote head pointer is accessible to the producer component and the consumer component, and (ii) increment the remote head pointer.

Example 14 includes the subject matter of any of Examples 1-13, and wherein: the remote buffer producer logic is further to determine whether the remote buffer is empty in response to a switch to the remote buffer mode; wherein to add the data item to the remote buffer further comprises to (i) add the data item to the remote buffer at a position indicated by a second remote head pointer in response to a determination that the remote buffer is not empty, wherein the second remote head pointer is accessible to the producer component and the consumer component, and (ii) increment the second remote head pointer in response to a determination that the remote buffer is not empty.

Example 15 includes the subject matter of any of Examples 1-14, and wherein each of the producer component and the consumer component comprises a functional block of a processor of the computing device.

Example 16 includes the subject matter of any of Examples 1-15, and wherein the producer component comprises an image signal processor or a display engine.

Example 17 includes the subject matter of any of Examples 1-16, and wherein the consumer component comprises a media encoder.

Example 18 includes the subject matter of any of Examples 1-17, and further comprising: a consumer component to determine whether the data item is available in the local buffer or the remote buffer during operation in a local buffer consumer mode or during operation in a remote buffer consumer mode; a local buffer consumer logic to (i) determine whether the local buffer is empty in response to a determination that the data item is available during operation in the local buffer consumer mode, and (ii) switch to the remote buffer consumer mode in response to a determination that the local buffer is empty; and a remote buffer consumer logic to (i) determine whether the remote buffer is empty in response to a determination that the data item is available during operation in the remote buffer consumer mode, and (ii) switch to the local buffer consumer mode in response to a determination that the remote buffer is empty; wherein the consumer component is further to (i) read the data item from the local buffer during operation in the local buffer consumer mode, and (ii) read the data item from the remote buffer during operation in the remote buffer consumer mode.

Example 19 includes a computing device for data streaming between components, the computing device comprising: a consumer component to determine whether a data item produced by a producer component of the computing device is available in a local buffer or a remote buffer during operation in a local buffer mode or during operation in a remote buffer mode, wherein the local buffer and the remote buffer are accessible to the consumer component and the producer component; a local buffer consumer logic to (i) determine whether the local buffer is empty in response to a determination that the data item is available during operation in the local buffer mode, and (ii) switch to the remote buffer mode in response to a determination that the local buffer is empty; and a remote buffer consumer logic to (i) determine whether the remote buffer is empty in response to a determination that the data item is available during operation in the remote buffer mode, and (ii) switch to the local buffer mode in response to a determination that the remote buffer is empty; wherein the consumer component is further to (i) read the data item from the local buffer during operation in the local buffer mode, and (ii) read the data item from the remote buffer during operation in the remote buffer mode.

Example 20 includes the subject matter of Example 19, and wherein the local buffer is accessible with lower power consumption than the remote buffer is accessible.

Example 21 includes the subject matter of any of Examples 19 and 20, and wherein: the computing device comprises a processor that includes the producer component and the consumer component; and the local buffer comprises a local memory or a cache of the processor.

Example 22 includes the subject matter of any of Examples 19-21, and wherein the remote buffer comprises a system memory of the computing device.

Example 23 includes the subject matter of any of Examples 19-22, and further comprising: a catch-up logic to determine whether the local buffer is above a high threshold in response to a determination that the data item is available; wherein the consumer component is further to switch to a catch-up operating mode in response to a determination that the local buffer is above the high threshold.

Example 24 includes the subject matter of any of Examples 19-23, and wherein: to determine whether the remote buffer is empty further comprises to determine whether the remote buffer is empty in response to a determination that the local buffer is below the high threshold; and the consumer component is further to switch to a normal operating mode in response to a determination that the remote buffer is empty.

Example 25 includes the subject matter of any of Examples 19-24, and wherein: to switch to the catch-up operating mode comprises to increase a consumption rate of the consumer component; and to switch to the normal operating mode comprises to decrease the consumption rate of the consumer component.

Example 26 includes the subject matter of any of Examples 19-25, and wherein: to increase the consumption rate of the consumer component comprises to increase a voltage or frequency scaling factor of the consumer component; and to decrease the consumption rate of the consumer component comprises to reduce the voltage or frequency scaling factor of the consumer component.

Example 27 includes the subject matter of any of Examples 19-26, and wherein to determine whether the local buffer is empty comprises to compare a local head pointer to a local tail pointer.

Example 28 includes the subject matter of any of Examples 19-27, and wherein to determine whether the remote buffer is empty comprises to compare a remote head pointer to a remote tail pointer.

Example 29 includes the subject matter of any of Examples 19-28, and wherein: to read the data item from the local buffer comprises to (i) read the data item from the local buffer at a position indicated by a local tail pointer, wherein the local tail pointer is accessible to the producer component and the consumer component, and (ii) increment the local tail pointer; and to read the data item from the remote buffer comprises to (i) read the data item from the remote buffer at a position indicated by a remote tail pointer, wherein the remote tail pointer is accessible to the producer component and the consumer component, and (ii) increment the remote tail pointer.

Example 30 includes the subject matter of any of Examples 19-29, and wherein each of the producer component and the consumer component comprises a functional block of a processor of the computing device.

Example 31 includes the subject matter of any of Examples 19-30, and wherein the producer component comprises an image signal processor or a display engine.

Example 32 includes the subject matter of any of Examples 19-31, and wherein the consumer component comprises a media encoder.

Example 33 includes the subject matter of any of Examples 19-32, and further comprising: a producer component to generate the data item during operation in a local buffer producer mode or during operation in a remote buffer producer mode; a local buffer producer logic to (i) determine whether the local buffer is full in response to generation of the data item during operation in the local buffer producer mode, and (ii) switch to the remote buffer producer mode in response to a determination that the local buffer is full; and a remote buffer producer logic to (i) determine whether the remote buffer is below a low threshold in response to generation of the data item during operation in the remote buffer producer mode, and (ii) switch to the local buffer producer mode in response to a determination that the remote buffer is below the low threshold; wherein the producer component is further to (i) add the data item to the local buffer during operation in the local buffer producer mode, and (ii) add the data item to the remote buffer during operation in the remote buffer producer mode.

Example 34 includes a method for data streaming between components, the method comprising: generating, by a producer component of a computing device, a data item while operating in a local buffer mode or while operating in a remote buffer mode; determining, by the computing device, whether a local buffer is full in response to generating the data item while operating in the local buffer mode; switching, by the computing device, to the remote buffer mode in response to determining that the local buffer is full; determining, by the computing device, whether a remote buffer is below a low threshold in response to generating the data item while operating in the remote buffer mode; switching, by the computing device, to the local buffer mode in response to determining that the remote buffer is below the low threshold; adding, by the producer component of the computing device, the data item to the local buffer while operating in the local buffer mode, wherein the local buffer is accessible by the producer component and a consumer component of the computing device; and adding, by the producer component of the computing device, the data item to the remote buffer while operating in the remote buffer mode, wherein the remote buffer is accessible by the producer component and the consumer component.

Example 35 includes the subject matter of Example 34, and wherein the local buffer is accessible with lower power consumption than the remote buffer is accessible.

Example 36 includes the subject matter of any of Examples 34 and 35, and wherein: the computing device comprises a processor that includes the producer component and the consumer component; and the local buffer comprises a local memory or a cache of the processor.

Example 37 includes the subject matter of any of Examples 34-36, and wherein the remote buffer comprises a system memory of the computing device.

Example 38 includes the subject matter of any of Examples 34-37, and further comprising: determining, by the computing device, whether the local buffer is above a high threshold in response to generating the data item; and switching, by the producer component of the computing device, to a catch-up operating mode in response to determining that the local buffer is above the high threshold.

Example 39 includes the subject matter of any of Examples 34-38, and further comprising: determining, by the computing device, whether the remote buffer is empty in response to determining that the local buffer is not above the high threshold; and switching, by the producer component of the computing device, to a normal operating mode in response to determining that the remote buffer is empty.

Example 40 includes the subject matter of any of Examples 34-39, and wherein: switching to the catch-up operating mode comprises reducing a production rate of the producer component; and switching to the normal operating mode comprises increasing the production rate of the producer component.

Example 41 includes the subject matter of any of Examples 34-40, and wherein: reducing the production rate of the producer component comprises reducing a voltage or frequency scaling factor of the producer component; and increasing the production rate of the producer component comprises increasing the voltage or frequency scaling factor of the producer component.

Example 42 includes the subject matter of any of Examples 34-41, and wherein determining whether the local buffer is full comprises determining whether adding the data item to the local buffer would exceed a capacity of the local buffer.

Example 43 includes the subject matter of any of Examples 34-42, and wherein determining whether the local buffer is full comprises comparing a local head pointer to a local tail pointer.

Example 44 includes the subject matter of any of Examples 34-43, and wherein determining whether remote buffer is below the low threshold comprises determining whether the remote buffer includes less than a predetermined number of data items.

Example 45 includes the subject matter of any of Examples 34-44, and wherein determining whether the remote buffer is below the low threshold comprises (i) comparing a remote head pointer to a remote tail pointer, and (ii) determining whether a distance between the remote head pointer and the remote tail pointer is less than the predetermined number of data items.

Example 46 includes the subject matter of any of Examples 34-45, and wherein: adding the data item to the local buffer comprises (i) adding the data item to the local buffer at a position indicated by a local head pointer, wherein the local head pointer is accessible to the producer component and the consumer component, and (ii) incrementing the local head pointer; and adding the data item to the remote buffer comprises (i) adding the data item to the remote buffer at a position indicated by a remote head pointer, wherein the remote head pointer is accessible to the producer component and the consumer component, and (ii) incrementing the remote head pointer.

Example 47 includes the subject matter of any of Examples 34-46, and further comprising: determining, by the computing device, whether the remote buffer is empty in response to switching to the remote buffer mode; wherein adding the data item to the remote buffer further comprises (i) adding the data item to the remote buffer at a position indicated by a second remote head pointer in response to determining that the remote buffer is not empty, wherein the second remote head pointer is accessible to the producer component and the consumer component, and (ii) incrementing the second remote head pointer in response to determining that the remote buffer is not empty.

Example 48 includes the subject matter of any of Examples 34-47, and wherein each of the producer component and the consumer component comprises a functional block of a processor of the computing device.

Example 49 includes the subject matter of any of Examples 34-48, and wherein the producer component comprises an image signal processor or a display engine.

Example 50 includes the subject matter of any of Examples 34-49, and wherein the consumer component comprises a media encoder.

Example 51 includes the subject matter of any of Examples 34-50, and further comprising: determining, by the consumer component, whether the data item is available in the local buffer or the remote buffer while operating in a local buffer consumer mode or while operating in a remote buffer consumer mode; determining, by the computing device, whether the local buffer is empty in response to determining that the data item is available while operating in the local buffer consumer mode; switching, by the computing device, to the remote buffer consumer mode in response to determining that the local buffer is empty; determining, by the computing device, whether the remote buffer is empty in response to determining that the data item is available while operating in the remote buffer consumer mode; switching, by the computing device, to the local buffer consumer mode in response to determining that the remote buffer is empty; reading, by the consumer component of the computing device, the data item from the local buffer while operating in the local buffer consumer mode; and reading, by the consumer component of the computing device, the data item from the remote buffer while operating in the remote buffer consumer mode.

Example 52 includes a method for data streaming between components, the method comprising: determining, by a consumer component of a computing device, whether a data item produced by a producer component of the computing device is available in a local buffer or a remote buffer while operating in a local buffer mode or while operating in a remote buffer mode, wherein the local buffer and the remote buffer are accessible to the consumer component and the producer component; determining, by the computing device, whether the local buffer is empty in response to determining that the data item is available while operating in the local buffer mode; switching, by the computing device, to the remote buffer mode in response to determining that the local buffer is empty; determining, by the computing device, whether the remote buffer is empty in response to determining that the data item is available while operating in the remote buffer mode; switching, by the computing device, to the local buffer mode in response to determining that the remote buffer is empty; reading, by the consumer component of the computing device, the data item from the local buffer while operating in the local buffer mode; and reading, by the consumer component of the computing device, the data item from the remote buffer while operating in the remote buffer mode.

Example 53 includes the subject matter of Example 52, and wherein the local buffer is accessible with lower power consumption than the remote buffer is accessible.

Example 54 includes the subject matter of any of Examples 52 and 53, and wherein: the computing device comprises a processor that includes the producer component and the consumer component; and the local buffer comprises a local memory or a cache of the processor.

Example 55 includes the subject matter of any of Examples 52-54, and wherein the remote buffer comprises a system memory of the computing device.

Example 56 includes the subject matter of any of Examples 52-55, and further comprising: determining, by the computing device, whether the local buffer is above a high threshold in response to determining that the data item is available; and switching, by the consumer component of the computing device, to a catch-up operating mode in response to determining that the local buffer is above the high threshold.

Example 57 includes the subject matter of any of Examples 52-56, and further comprising: switching, by the consumer component of the computing device, to a normal operating mode in response to determining that the remote buffer is empty; wherein determining whether the remote buffer is empty further comprises determining whether the remote buffer is empty in response to determining that the local buffer is below the high threshold.

Example 58 includes the subject matter of any of Examples 52-57, and wherein: switching to the catch-up operating mode comprises increasing a consumption rate of the consumer component; and switching to the normal operating mode comprises decreasing the consumption rate of the consumer component.

Example 59 includes the subject matter of any of Examples 52-58, and wherein: increasing the consumption rate of the consumer component comprises increasing a voltage or frequency scaling factor of the consumer component; and decreasing the consumption rate of the consumer component comprises reducing the voltage or frequency scaling factor of the consumer component.

Example 60 includes the subject matter of any of Examples 52-59, and wherein determining whether the local buffer is empty comprises comparing a local head pointer to a local tail pointer.

Example 61 includes the subject matter of any of Examples 52-60, and wherein determining whether the remote buffer is empty comprises comparing a remote head pointer to a remote tail pointer.

Example 62 includes the subject matter of any of Examples 52-61, and wherein: reading the data item from the local buffer comprises (i) reading the data item from the local buffer at a position indicated by a local tail pointer, wherein the local tail pointer is accessible to the producer component and the consumer component, and (ii) incrementing the local tail pointer; and reading the data item from the remote buffer comprises (i) reading the data item from the remote buffer at a position indicated by a remote tail pointer, wherein the remote tail pointer is accessible to the producer component and the consumer component, and (ii) incrementing the remote tail pointer.

Example 63 includes the subject matter of any of Examples 52-62, and wherein each of the producer component and the consumer component comprises a functional block of a processor of the computing device.

Example 64 includes the subject matter of any of Examples 52-63, and wherein the producer component comprises an image signal processor or a display engine.

Example 65 includes the subject matter of any of Examples 52-64, and wherein the consumer component comprises a media encoder.

Example 66 includes the subject matter of any of Examples 52-65, and further comprising: generating, by the producer component of the computing device, the data item while operating in a local buffer producer mode or while operating in a remote buffer producer mode; determining, by the computing device, whether the local buffer is full in response to generating the data item while operating in the local buffer producer mode; switching, by the computing device, to the remote buffer producer mode in response to determining that the local buffer is full; determining, by the computing device, whether the remote buffer is below a low threshold in response to generating the data item while operating in the remote buffer producer mode; switching, by the computing device, to the local buffer producer mode in response to determining that the remote buffer is below the low threshold; adding, by the producer component of the computing device, the data item to the local buffer while operating in the local buffer producer mode; and adding, by the producer component of the computing device, the data item to the remote buffer while operating in the remote buffer producer mode.

Example 67 includes a computing device comprising: a processor; and a memory having stored therein a plurality of instructions that when executed by the processor cause the computing device to perform the method of any of Examples 34-66.

Example 68 includes one or more machine readable storage media comprising a plurality of instructions stored thereon that in response to being executed result in a computing device performing the method of any of Examples 34-66.

Example 69 includes a computing device comprising means for performing the method of any of Examples 34-66.

Example 70 includes a computing device for data streaming between components, the computing device comprising: means for generating, by a producer component of the computing device, a data item while operating in a local buffer mode or while operating in a remote buffer mode; means for determining whether a local buffer is full in response to generating the data item while operating in the local buffer mode; means for switching to the remote buffer mode in response to determining that the local buffer is full; means for determining whether a remote buffer is below a low threshold in response to generating the data item while operating in the remote buffer mode; means for switching to the local buffer mode in response to determining that the remote buffer is below the low threshold; means for adding, by the producer component of the computing device, the data item to the local buffer while operating in the local buffer mode, wherein the local buffer is accessible by the producer component and a consumer component of the computing device; and means for adding, by the producer component of the computing device, the data item to the remote buffer while operating in the remote buffer mode, wherein the remote buffer is accessible by the producer component and the consumer component.

Example 71 includes the subject matter of Example 70, and wherein the local buffer is accessible with lower power consumption than the remote buffer is accessible.

Example 72 includes the subject matter of any of Examples 70 and 71, and wherein: the computing device comprises a processor that includes the producer component and the consumer component; and the local buffer comprises a local memory or a cache of the processor.

Example 73 includes the subject matter of any of Examples 70-72, and wherein the remote buffer comprises a system memory of the computing device.

Example 74 includes the subject matter of any of Examples 70-73, and further comprising: means for determining whether the local buffer is above a high threshold in response to generating the data item; and means for switching, by the producer component of the computing device, to a catch-up operating mode in response to determining that the local buffer is above the high threshold.

Example 75 includes the subject matter of any of Examples 70-74, and further comprising: means for determining whether the remote buffer is empty in response to determining that the local buffer is not above the high threshold; and means for switching, by the producer component of the computing device, to a normal operating mode in response to determining that the remote buffer is empty.

Example 76 includes the subject matter of any of Examples 70-75, and wherein: the means for switching to the catch-up operating mode comprises means for reducing a production rate of the producer component; and the means for switching to the normal operating mode comprises means for increasing the production rate of the producer component.

Example 77 includes the subject matter of any of Examples 70-76, and wherein: the means for reducing the production rate of the producer component comprises means for reducing a voltage or frequency scaling factor of the producer component; and the means for increasing the production rate of the producer component comprises means for increasing the voltage or frequency scaling factor of the producer component.

Example 78 includes the subject matter of any of Examples 70-77, and wherein the means for determining whether the local buffer is full comprises means for determining whether adding the data item to the local buffer would exceed a capacity of the local buffer.

Example 79 includes the subject matter of any of Examples 70-78, and wherein the means for determining whether the local buffer is full comprises means for comparing a local head pointer to a local tail pointer.

Example 80 includes the subject matter of any of Examples 70-79, and wherein the means for determining whether remote buffer is below the low threshold comprises means for determining whether the remote buffer includes less than a predetermined number of data items.

Example 81 includes the subject matter of any of Examples 70-80, and wherein the means for determining whether the remote buffer is below the low threshold comprises (i) means for comparing a remote head pointer to a remote tail pointer, and (ii) means for determining whether a distance between the remote head pointer and the remote tail pointer is less than the predetermined number of data items.

Example 82 includes the subject matter of any of Examples 70-81, and wherein: the means for adding the data item to the local buffer comprises (i) means for adding the data item to the local buffer at a position indicated by a local head pointer, wherein the local head pointer is accessible to the producer component and the consumer component, and (ii) means for incrementing the local head pointer; and the means for adding the data item to the remote buffer comprises (i) means for adding the data item to the remote buffer at a position indicated by a remote head pointer, wherein the remote head pointer is accessible to the producer component and the consumer component, and (ii) means for incrementing the remote head pointer.

Example 83 includes the subject matter of any of Examples 70-82, and further comprising: means for determining whether the remote buffer is empty in response to switching to the remote buffer mode; wherein the means for adding the data item to the remote buffer further comprises (i) means for adding the data item to the remote buffer at a position indicated by a second remote head pointer in response to determining that the remote buffer is not empty, wherein the second remote head pointer is accessible to the producer component and the consumer component, and (ii) means for incrementing the second remote head pointer in response to determining that the remote buffer is not empty.

Example 84 includes the subject matter of any of Examples 70-83, and wherein each of the producer component and the consumer component comprises a functional block of a processor of the computing device.

Example 85 includes the subject matter of any of Examples 70-84, and wherein the producer component comprises an image signal processor or a display engine.

Example 86 includes the subject matter of any of Examples 70-85, and wherein the consumer component comprises a media encoder.

Example 87 includes the subject matter of any of Examples 70-86, and further comprising: means for determining, by the consumer component, whether the data item is available in the local buffer or the remote buffer while operating in a local buffer consumer mode or while operating in a remote buffer consumer mode; means for determining whether the local buffer is empty in response to determining that the data item is available while operating in the local buffer consumer mode; means for switching to the remote buffer consumer mode in response to determining that the local buffer is empty; means for determining whether the remote buffer is empty in response to determining that the data item is available while operating in the remote buffer consumer mode; means for switching to the local buffer consumer mode in response to determining that the remote buffer is empty; means for reading, by the consumer component of the computing device, the data item from the local buffer while operating in the local buffer consumer mode; and means for reading, by the consumer component of the computing device, the data item from the remote buffer while operating in the remote buffer consumer mode.

Example 88 includes a computing device for data streaming between components, the computing device comprising: means for determining, by a consumer component of the computing device, whether a data item produced by a producer component of the computing device is available in a local buffer or a remote buffer while operating in a local buffer mode or while operating in a remote buffer mode, wherein the local buffer and the remote buffer are accessible to the consumer component and the producer component; means for determining whether the local buffer is empty in response to determining that the data item is available while operating in the local buffer mode; means for switching to the remote buffer mode in response to determining that the local buffer is empty; means for determining whether the remote buffer is empty in response to determining that the data item is available while operating in the remote buffer mode; means for switching to the local buffer mode in response to determining that the remote buffer is empty; means for reading, by the consumer component of the computing device, the data item from the local buffer while operating in the local buffer mode; and means for reading, by the consumer component of the computing device, the data item from the remote buffer while operating in the remote buffer mode.

Example 89 includes the subject matter of Example 88, and wherein the local buffer is accessible with lower power consumption than the remote buffer is accessible.

Example 90 includes the subject matter of any of Examples 88 and 89, and wherein: the computing device comprises a processor that includes the producer component and the consumer component; and the local buffer comprises a local memory or a cache of the processor.

Example 91 includes the subject matter of any of Examples 88-90, and wherein the remote buffer comprises a system memory of the computing device.

Example 92 includes the subject matter of any of Examples 88-91, and further comprising: means for determining whether the local buffer is above a high threshold in response to determining that the data item is available; and means for switching, by the consumer component of the computing device, to a catch-up operating mode in response to determining that the local buffer is above the high threshold.

Example 93 includes the subject matter of any of Examples 88-92, and further comprising: means for switching, by the consumer component of the computing device, to a normal operating mode in response to determining that the remote buffer is empty; wherein the means for determining whether the remote buffer is empty further comprises means for determining whether the remote buffer is empty in response to determining that the local buffer is below the high threshold.

Example 94 includes the subject matter of any of Examples 88-93, and wherein: the means for switching to the catch-up operating mode comprises means for increasing a consumption rate of the consumer component; and the means for switching to the normal operating mode comprises means for decreasing the consumption rate of the consumer component.

Example 95 includes the subject matter of any of Examples 88-94, and wherein: the means for increasing the consumption rate of the consumer component comprises means for increasing a voltage or frequency scaling factor of the consumer component; and the means for decreasing the consumption rate of the consumer component comprises means for reducing the voltage or frequency scaling factor of the consumer component.

Example 96 includes the subject matter of any of Examples 88-95, and wherein the means for determining whether the local buffer is empty comprises means for comparing a local head pointer to a local tail pointer.

Example 97 includes the subject matter of any of Examples 88-96, and wherein the means for determining whether the remote buffer is empty comprises means for comparing a remote head pointer to a remote tail pointer.

Example 98 includes the subject matter of any of Examples 88-97, and wherein: the means for reading the data item from the local buffer comprises (i) means for reading the data item from the local buffer at a position indicated by a local tail pointer, wherein the local tail pointer is accessible to the producer component and the consumer component, and (ii) means for incrementing the local tail pointer; and the means for reading the data item from the remote buffer comprises (i) means for reading the data item from the remote buffer at a position indicated by a remote tail pointer, wherein the remote tail pointer is accessible to the producer component and the consumer component, and (ii) means for incrementing the remote tail pointer.

Example 99 includes the subject matter of any of Examples 88-98, and wherein each of the producer component and the consumer component comprises a functional block of a processor of the computing device.

Example 100 includes the subject matter of any of Examples 88-99, wherein the producer component comprises an image signal processor or a display engine.

Example 101 includes the subject matter of any of Examples 88-100, and wherein the consumer component comprises a media encoder.

Example 102 includes the subject matter of any of Examples 88-101, and further comprising: means for generating, by the producer component of the computing device, the data item while operating in a local buffer producer mode or while operating in a remote buffer producer mode; means for determining whether the local buffer is full in response to generating the data item while operating in the local buffer producer mode; means for switching to the remote buffer producer mode in response to determining that the local buffer is full; means for determining whether the remote buffer is below a low threshold in response to generating the data item while operating in the remote buffer producer mode; means for switching to the local buffer producer mode in response to determining that the remote buffer is below the low threshold; means for adding, by the producer component of the computing device, the data item to the local buffer while operating in the local buffer producer mode; and means for adding, by the producer component of the computing device, the data item to the remote buffer while operating in the remote buffer producer mode.

The invention claimed is:

1. A computing device for data streaming between components, the computing device comprising:
   a producer component to (i) generate a first data item during operation in a local buffer mode and (ii) generate a second data item during operation in a remote buffer mode in response to generation of the first data item;
   a local buffer producer logic to (i) determine whether a local buffer is full in response to generation of the first data item during operation in the local buffer mode, and (ii) switch to the remote buffer mode in response to a determination that the local buffer is full; and
   a remote buffer producer logic to (i) determine whether a remote buffer is below a low threshold in response to generation of the second data item during operation in the remote buffer mode, and (ii) switch to the local buffer mode in response to a determination that the remote buffer is below the low threshold;
   wherein the producer component is further to (i) add the second data item to the local buffer during operation in the local buffer mode, wherein the local buffer is accessible by the producer component and a consumer component of the computing device, and (ii) add the first data item to the remote buffer during operation in the remote buffer mode, wherein the remote buffer is accessible by the producer component and the consumer component.

2. The computing device of claim 1, wherein the local buffer is accessible with lower power consumption than the remote buffer is accessible.

3. The computing device of claim 1, further comprising:
   a catch-up logic to determine whether the local buffer is above a high threshold in response to generation of the first data item and in response to generation of the second data item;
   wherein the producer component is further to switch to a catch-up operating mode in response to a determination that the local buffer is above the high threshold, wherein to switch to the catch-up operating mode comprises to reduce a production rate of the producer component.

4. The computing device of claim 3, wherein:
   the catch-up logic is further to determine whether the remote buffer is empty in response to a determination that the local buffer is not above the high threshold; and
   the producer component is further to switch to a normal operating mode in response to a determination that the remote buffer is empty, wherein to switch to the normal operating mode comprises to increase the production rate of the producer component.

5. The computing device of claim 1, wherein to determine whether the remote buffer is below the low threshold comprises to determine whether the remote buffer includes less than a predetermined number of data items.

6. The computing device of claim 5, wherein to determine whether the remote buffer is below the low threshold comprises to (i) compare a remote head pointer to a remote tail pointer, and (ii) determine whether a distance between the remote head pointer and the remote tail pointer is less than the predetermined number of data items.

7. The computing device of claim 1, wherein:
   to add the second data item to the local buffer comprises to (i) add the second data item to the local buffer at a position indicated by a local head pointer, wherein the local head pointer is accessible to the producer component and the consumer component, and (ii) increment the local head pointer; and
   to add the first data item to the remote buffer comprises to (i) add the first data item to the remote buffer at a position indicated by a remote head pointer, wherein the remote head pointer is accessible to the producer component and the consumer component, and (ii) increment the remote head pointer.

8. The computing device of claim 1, wherein:
   the remote buffer producer logic is further to determine whether the remote buffer is empty based on a first remote head pointer and a first remote tail pointer in response to a switch to the remote buffer mode, wherein the first remote head pointer is accessible to the producer component and the consumer component;
   wherein to add the first data item to the remote buffer comprises to (i) add the first data item to the remote buffer at a position indicated by a second remote head pointer in response to a determination that the remote buffer is not empty, wherein the second remote head pointer is accessible to the producer component and the consumer component, and (ii) increment the second remote head pointer in response to a determination that the remote buffer is not empty.

9. The computing device of claim 1, wherein each of the producer component and the consumer component comprises a functional block of a processor of the computing device.

10. The computing device of claim 1, further comprising a local buffer consumer logic and a remote buffer consumer logic, wherein:
    the consumer component is to (i) determine whether the first data item is available in the remote buffer during operation in a local buffer consumer mode and (ii) determine whether the second data item is available in the local buffer during operation in a remote buffer consumer mode;
    the local buffer consumer logic is to (i) determine whether the local buffer is empty in response to a determination that the first data item is available during operation in the local buffer consumer mode, and (ii) switch to the remote buffer consumer mode in response to a determination that the local buffer is empty;
    the remote buffer consumer logic is to (i) determine whether the remote buffer is empty in response to a determination that the second data item is available during operation in the remote buffer consumer mode, and (ii) switch to the local buffer consumer mode in response to a determination that the remote buffer is empty; and
    the consumer component is further to (i) read the second data item from the local buffer during operation in the local buffer consumer mode, and (ii) read the first data item from the remote buffer during operation in the remote buffer consumer mode.

11. One or more computer-readable storage media comprising a plurality of instructions that in response to being executed cause a computing device to:
- generate, by a producer component of the computing device, a first data item while operating in a local buffer mode;
- determine whether a local buffer is full in response to generating the first data item while operating in the local buffer mode;
- switch to a remote buffer mode in response to determining that the local buffer is full;
- add, by the producer component of the computing device, the first data item to a remote buffer while operating in the remote buffer mode, wherein the remote buffer is accessible by the producer component and a consumer component of the computing device;
- generate, by the producer component of the computing device, a second data item while operating in the remote buffer mode in response to adding the first data item;
- determine whether the remote buffer is below a low threshold in response to generating the second data item while operating in the remote buffer mode;
- switch to the local buffer mode in response to determining that the remote buffer is below the low threshold; and
- add, by the producer component of the computing device, the second data item to the local buffer while operating in the local buffer mode, wherein the local buffer is accessible by the producer component and the consumer component.

12. The one or more computer-readable storage media of claim 11, wherein the local buffer is accessible with lower power consumption than the remote buffer is accessible.

13. The one or more computer-readable storage media of claim 11, further comprising a plurality of instructions that in response to being executed cause the computing device to:
- determine whether the local buffer is above a high threshold in response to generating the first data item and in response to generating the second data item; and
- switch, by the producer component of the computing device, to a catch-up operating mode in response to determining that the local buffer is above the high threshold, wherein to switch to the catch-up operating mode comprises to reduce a production rate of the producer component.

14. The one or more computer-readable storage media of claim 11, wherein to determine whether the remote buffer is below the low threshold comprises to determine whether the remote buffer includes less than a predetermined number of data items.

15. The one or more computer-readable storage media of claim 11, further comprising a plurality of instructions that in response to being executed cause the computing device to:
- determine, by the consumer component, whether the first data item is available in the remote buffer while operating in a local buffer consumer mode;
- determine whether the local buffer is empty in response to determining that the first data item is available while operating in the local buffer consumer mode;
- switch to a remote buffer consumer mode in response to determining that the local buffer is empty;
- determine, by the consumer component, whether the second data item is available in the local buffer while operating in the remote buffer consumer mode;
- determine whether the remote buffer is empty in response to determining that the second data item is available while operating in the remote buffer consumer mode;
- switch to the local buffer consumer mode in response to determining that the remote buffer is empty;
- read, by the consumer component of the computing device, the second data item from the local buffer while operating in the local buffer consumer mode; and
- read, by the consumer component of the computing device, the first data item from the remote buffer while operating in the remote buffer consumer mode.

* * * * *